United States Patent
Ohno et al.

(10) Patent No.: US 12,246,670 B2
(45) Date of Patent: *Mar. 11, 2025

(54) AIRBAG DEVICE AND PASSENGER PROTECTION DEVICE

(71) Applicant: TOYOTA JIDOSHA KABUSHIKI KAISHA, Toyota (JP)

(72) Inventors: Mitsuyoshi Ohno, Miyoshi (JP); Takeshi Yamamoto, Toki (JP); Toshiki Iwama, Toyota (JP); Yoshito Kusuhara, Ichinomiya (JP); Tsutomu Ishii, Ichinomiya (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 30 days.

This patent is subject to a terminal disclaimer.

(21) Appl. No.: 18/367,665

(22) Filed: Sep. 13, 2023

(65) Prior Publication Data
US 2024/0123935 A1 Apr. 18, 2024

(30) Foreign Application Priority Data
Oct. 14, 2022 (JP) ................. 2022-165755

(51) Int. Cl.
*B60R 21/207* (2006.01)
*B60R 21/00* (2006.01)
(Continued)

(52) U.S. Cl.
CPC .......... *B60R 21/207* (2013.01); *B60R 21/233* (2013.01); *B60R 21/2338* (2013.01);
(Continued)

(58) Field of Classification Search
CPC ................ B60R 21/207; B60R 21/233; B60R 2021/2078; B60R 2021/23308; B60R 2021/23386; B60R 2021/23388
See application file for complete search history.

(56) References Cited

U.S. PATENT DOCUMENTS 5,926,928 A * 7/1999 Lundstedt ............ A44B 11/266
24/615
6,000,715 A 12/1999 Tschaeschke
(Continued)

FOREIGN PATENT DOCUMENTS

CN 109421648 A * 3/2019 ............... B60N 2/14
CN 109421655 A * 3/2019 ......... A44B 11/2561
(Continued)

OTHER PUBLICATIONS

Office Action issued to U.S. Appl. No. 18/367,646 dated May 20, 2024 (13 Pages).

*Primary Examiner* — Paul N Dickson
*Assistant Examiner* — Tiffany L Webb
(74) *Attorney, Agent, or Firm* — Dinsmore & Shohl LLP

(57) ABSTRACT

An airbag device including an airbag that inflates and deploys from a seat rear side of a vehicle seat toward a seat front side via a seat upper side. In an inflated and deployed state, the airbag includes a pair of front-rear chambers extending in a front-rear direction via left and right sides of a head of a passenger, an airbag body that is in communication with the pair of front-rear chambers and that is disposed at a seat front side of the passenger between the pair of front-rear chambers, and a pair of rear tethers including one-end portions attached to the airbag body and other-end portions attached to a seatback. At a time of restraint of the passenger, the airbag body is pulled by the rear tethers obliquely rearward and downward such that the front-rear chambers press shoulders of the passenger from a seat upper side.

15 Claims, 21 Drawing Sheets

(51) Int. Cl.
  *B60R 21/233*  (2006.01)
  *B60R 21/2338*  (2011.01)
  *B60R 21/013*  (2006.01)

(52) U.S. Cl.
  CPC . *B60R 2021/0004* (2013.01); *B60R 2021/006* (2013.01); *B60R 21/013* (2013.01); *B60R 2021/2076* (2013.01); *B60R 2021/2078* (2013.01); *B60R 2021/23308* (2013.01); *B60R 2021/23388* (2013.01)

(56) References Cited

U.S. PATENT DOCUMENTS

| | | | |
|---|---|---|---|
| 10,351,090 B2 * | 7/2019 | Yamada | B60R 21/233 |
| 11,285,903 B2 * | 3/2022 | Kokeguchi | B60R 21/207 |
| 11,285,904 B2 * | 3/2022 | Jung | B60R 21/2338 |
| 11,383,667 B1 * | 7/2022 | Kadam | B60R 21/23138 |
| 11,427,150 B1 * | 8/2022 | Jaradi | B60R 21/207 |
| 11,577,682 B1 * | 2/2023 | Bates | B60R 21/214 |
| 2006/0119083 A1 * | 6/2006 | Peng | B60R 21/2338 280/730.2 |
| 2007/0205591 A1 | 9/2007 | Bito | |
| 2009/0189376 A1 * | 7/2009 | Vigeant | B60R 21/233 280/743.2 |
| 2015/0166002 A1 * | 6/2015 | Fukawatase | B60R 21/233 280/730.1 |
| 2016/0121839 A1 * | 5/2016 | Ko | B60R 21/233 280/730.1 |
| 2017/0015272 A1 * | 1/2017 | Ohno | B60R 22/46 |
| 2017/0028955 A1 * | 2/2017 | Ohno | B60R 21/233 |
| 2017/0057456 A1 * | 3/2017 | Ohno | B60R 21/231 |
| 2017/0158155 A1 * | 6/2017 | Ohno | B60R 21/237 |
| 2017/0282834 A1 * | 10/2017 | Sugie | B60R 21/231 |
| 2017/0291565 A1 | 10/2017 | Yamamoto et al. | |
| 2017/0297524 A1 * | 10/2017 | Sugie | B60R 21/233 |
| 2017/0334385 A1 * | 11/2017 | Sakakibara | B60N 2/686 |
| 2017/0334386 A1 * | 11/2017 | Park | B60R 21/2338 |
| 2018/0056205 A1 * | 3/2018 | Yamada | B60R 21/205 |
| 2018/0126942 A1 * | 5/2018 | Ohno | B60R 21/237 |
| 2018/0222432 A1 * | 8/2018 | Schneider | B60R 21/262 |
| 2018/0236962 A1 * | 8/2018 | Ohno | B60R 21/23138 |
| 2019/0016293 A1 | 1/2019 | Saso | |
| 2019/0031132 A1 * | 1/2019 | Dry | B60R 21/2338 |
| 2019/0054884 A1 * | 2/2019 | Dry | B60R 21/2342 |
| 2019/0111879 A1 * | 4/2019 | Ohmi | B60R 21/231 |
| 2019/0275979 A1 * | 9/2019 | Dry | B60R 21/207 |
| 2019/0291678 A1 * | 9/2019 | Cho | B60R 21/233 |
| 2019/0389420 A1 * | 12/2019 | Dry | B60R 21/231 |
| 2020/0156586 A1 * | 5/2020 | Lin | B60N 2/0028 |
| 2020/0290548 A1 * | 9/2020 | Kokeguchi | B60R 21/233 |
| 2021/0061211 A1 * | 3/2021 | Jung | B60R 21/2338 |
| 2021/0316695 A1 * | 10/2021 | Matsushita | B60R 21/207 |
| 2021/0402949 A1 * | 12/2021 | Sung | B60R 21/2338 |
| 2022/0017036 A1 * | 1/2022 | Jeong | B60R 21/2338 |
| 2022/0111818 A1 * | 4/2022 | Schneider | B60R 21/23138 |
| 2022/0203921 A1 * | 6/2022 | Kawamura | B60R 21/2338 |
| 2022/0340096 A1 * | 10/2022 | Axblom | B60R 21/2338 |
| 2022/0348161 A1 * | 11/2022 | Faruque | B60R 21/233 |
| 2022/0388472 A1 * | 12/2022 | Hwangbo | B60R 21/23138 |
| 2023/0065150 A1 * | 3/2023 | Min | B60R 21/233 |
| 2023/0067856 A1 * | 3/2023 | Min | B60R 21/233 |
| 2023/0294629 A1 * | 9/2023 | Nakajima | B60R 21/233 280/729 |
| 2023/0303028 A1 * | 9/2023 | Ohno | B60R 21/2338 |
| 2023/0339421 A1 * | 10/2023 | Yamamoto | B60R 21/207 |
| 2023/0406258 A1 * | 12/2023 | Line | B60R 21/214 |
| 2024/0083381 A1 * | 3/2024 | Ito | B60R 21/23138 |
| 2024/0123932 A1 | 4/2024 | Ohno et al. | |
| 2024/0123933 A1 | 4/2024 | Ohno et al. | |
| 2024/0123934 A1 | 4/2024 | Ohno et al. | |
| 2024/0123936 A1 | 4/2024 | Ohno et al. | |
| 2024/0123937 A1 | 4/2024 | Ohno et al. | |
| 2024/0123940 A1 | 4/2024 | Ohno et al. | |

FOREIGN PATENT DOCUMENTS

| | | | | |
|---|---|---|---|---|
| CN | 114435295 A | * | 5/2022 | |
| CN | 114906090 A | * | 8/2022 | |
| CN | 217435673 U | * | 9/2022 | |
| CN | 117284234 A | * | 12/2023 | |
| DE | 19834061 A1 | * | 2/2000 | B60N 2/4876 |
| DE | 202007008161 U1 | * | 10/2007 | B60R 21/217 |
| DE | 102011084093 A1 | * | 4/2012 | B60R 21/23138 |
| DE | 102017131121 A1 | * | 6/2019 | |
| DE | 102019118843 A1 | * | 1/2021 | B60R 21/207 |
| DE | 102020125611 A1 | * | 4/2021 | B60N 2/143 |
| DE | 102023106465 A1 | * | 10/2023 | B60R 21/207 |
| DE | 102022118796 A1 | * | 2/2024 | |
| GB | 2473608 A | * | 3/2011 | B60R 21/231 |
| JP | H1067287 A | | 3/1998 | |
| JP | 2017-185978 A | | 10/2017 | |
| JP | 2019-018593 A | | 2/2019 | |
| JP | 2019-218013 A | | 12/2019 | |
| JP | 2019-218014 A | | 12/2019 | |
| WO | WO-2022009622 A1 | * | 1/2022 | B60R 21/207 |
| WO | WO-2022097459 A1 | * | 5/2022 | |
| WO | WO-2022225264 A1 | * | 10/2022 | |
| WO | WO-2023160859 A1 | * | 8/2023 | B60R 21/23138 |
| WO | WO-2024048930 A1 | * | 3/2024 | |

* cited by examiner

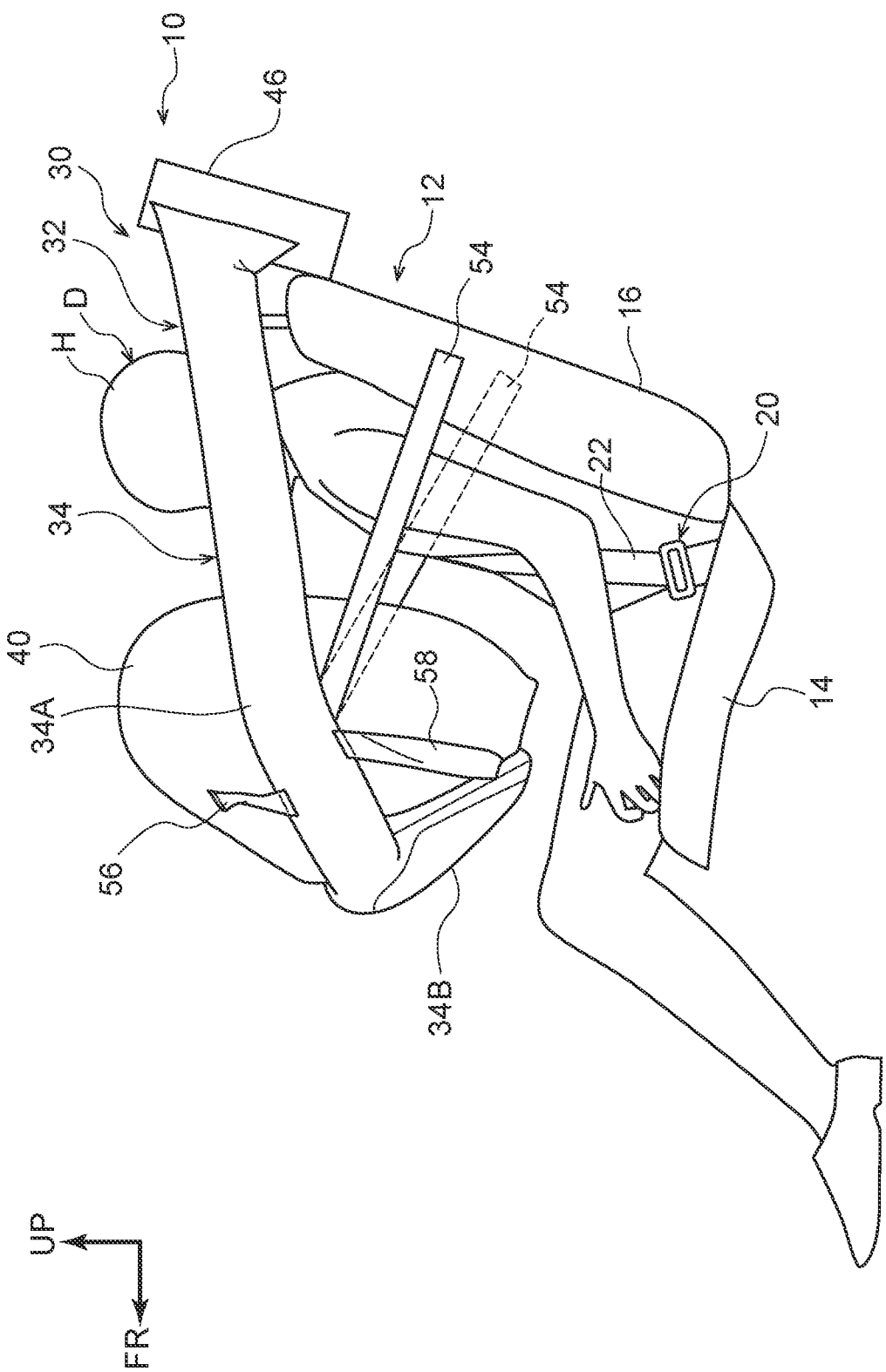

AIRBAG DEVICE AND PASSENGER PROTECTION DEVICE

CROSS-REFERENCE TO RELATED APPLICATION

This application is based on and claims priority under 35 USC 119 from Japanese Patent Application No. 2022-165755 filed on Oct. 14, 2022, the disclosure of which is incorporated by reference herein.

BACKGROUND

Technical Field

The present disclosure relates to an airbag device and to a passenger protection device including an airbag device.

Related Art

For example, an airbag device disclosed in Japanese Patent Application Laid-Open (JP-A) No. 2019-018593 includes an inflator that generates gas at high pressure at a time of a shock input, and a bag body that inflates and deploys from a seatback of a vehicle seat on receipt of gas supplied from the inflator. The bag body includes a truck support section that deploys at an opposite side of a trunk of a passenger seated in the vehicle seat to the seatback side of the trunk, and a pair of head support sections that respectively deploy at each seat width direction side of a head of the passenger and that connect to the truck support section. In a deployed state, an escape portion is formed to the bag body so as to pass through in a height direction between the pair of head support sections and avoiding the head of the passenger. Furthermore, there is a coupling member provided in the airbag device to couple between the deployed truck support section either the vehicle seat or vehicle body.

As described above, a coupling member is provided in this airbag device to couple the deployed truck support section to the vehicle seat or vehicle body. This means that movement of the deployed truck support section toward the seat front side is limited by the coupling member, and the upper body of the passenger is caught by the truck support section. Namely, the passenger upper body is restrained.

However, a relative height positional relationship between the airbag body (bag body) of the airbag device and the passenger upper body (including the head) is different depending on the build of the passenger. Namely, for a passenger having a small build (for example, a passenger equivalent to a person dummy AF05), there is a concern that a restraint force of the airbag body to the head might be excessive and cause neck retroflexion.

However, for a large build passenger (for example, a passenger equivalent to a person dummy AM95) when the airbag device is provided at a rear seat, there is a concern that the restraint force of the airbag body to the head might be insufficient and give rise to the head bottoming out on a front seat. There is accordingly room for improvement from the perspective of appropriately restraining the upper body of a passenger according to the build of the passenger.

SUMMARY

The present disclosure provides an airbag device capable of appropriately restraining a passenger irrespective of the build of the passenger, and a passenger protection device of the same.

An airbag device of a first aspect includes an inflator that generates gas at a time of a vehicle collision, and an airbag that is supplied with gas generated by the inflator, and that inflates and deploys from a seat rear side of a vehicle seat toward a seat front side via a seat upper side. In an inflated and deployed state the airbag includes a pair of front-rear chambers extending in a seat front-rear direction via left and right sides of a head of a passenger seated in the vehicle seat, an airbag body that is in communication with the pair of front-rear chambers and that is disposed at a seat front side of the passenger, between the pair of front-rear chambers, and a pair of rear tethers including one-end portions attached to the airbag body or to seat front side portions of the front-rear chambers, and other-end portions attached to a seatback of the vehicle seat or a vehicle body. At a time of restraint of the passenger, the airbag body or the seat front side portions of the front-rear chambers are pulled by the rear tethers toward a seat obliquely rearward and downward side such that the front-rear chambers press shoulders of the passenger from the seat upper side.

In the first aspect, gas generated by an inflator at a time of a vehicle collision is supplied into the airbag, and the airbag is inflated and deployed from the seat rear side of the vehicle seat toward the seat front side via the seat upper side. In the inflated and deployed state, the airbag includes the pair of front-rear chambers extending in the seat front-rear direction via left and right sides of the head of the passenger seated in the vehicle seat, and the airbag body that is in communication with the pair of front-rear chambers and that is disposed at the seat front side of the passenger, between the pair of front-rear chambers.

The airbag also includes the pair of rear tethers including the one-end portions attached to the airbag body or to the seat front side portions of the front-rear chambers, and the other-end portions attached to the seatback of the vehicle seat or the vehicle body.

This means that at a time of restraint of the passenger, the airbag body or the seat front side portions of the front-rear chambers are pulled by the pair of rear tethers toward the seat obliquely rearward and downward side such that the front-rear chambers press the shoulders of the passenger from the seat upper side.

The seat height direction position of the airbag body with respect to the head of the passenger is thereby stabilized, irrespective of the build of the passenger. Namely, the passenger is appropriately restrained by the airbag irrespective of the build of the passenger. Moreover, swinging of the airbag in the seat height direction and seat front-rear direction is suppressed by the pair of rear tethers when the airbag is completely inflated and deployed. Note that reference here to "at a time of a vehicle collision" encompasses when the inevitability of a collision is foreseen (predicted).

An airbag device of a second aspect is the airbag device of the first aspect, wherein a width between inside faces of the front-rear chambers is a shoulder width of a passenger having a small build equivalent to a person dummy AF05.

In the second aspect, the width between the inside faces of the pair of front-rear chambers is the shoulder width of the small build passenger equivalent to a person dummy AF05. This means that the front-rear chambers do not come off from the shoulders of the passenger irrespective of the build of the passenger. Namely, at a time of passenger restraint, the shoulders of the passenger are pressed by the front-rear chambers with certainty from the seat upper side irrespective of the build of the passenger. The passenger is accordingly appropriately restrained.

An airbag device of a third aspect is the airbag device of the first aspect, wherein a pulling force from the rear tethers acting toward a seat obliquely rearward and downward side with respect to the airbag body or the seat front side portions of the front-rear chambers is greater at a non-shoulder belt side than at a shoulder belt side of a three-point seatbelt device such that left and right passenger restraint forces resulting from the airbag body and the seatbelt device are substantially the same.

In the third aspect, the pulling force from the rear tethers acting toward a seat obliquely rearward and downward side with respect to the airbag body or the seat front side portions of the front-rear chambers is greater at the non-shoulder belt side than at the shoulder belt side of the three-point seatbelt device such that the left and right passenger restraint forces resulting from the airbag body and the seatbelt device are substantially the same. This accordingly gives good balance in the left and right restraint of the passenger, and improves the passenger restraint performance.

Moreover, an airbag device of a fourth aspect is the airbag device of the third aspect, wherein a height position of an other-end portion of a rear tether at the non-shoulder belt side is higher than a height position of an other-end portion of a rear tether at the shoulder belt side.

In the fourth aspect, the height position of an other-end portion of a rear tether at the non-shoulder belt side is higher than the height position of an other-end portion of a rear tether at the shoulder belt side. This means that a pulling angle (pulling force) of the rear tether is different between the left and right, such that the pulling force from the rear tethers toward the seat obliquely rearward and downward side with respect to the airbag body or the seat front side portions of the front-rear chambers is greater on the non-shoulder belt side than on the shoulder belt side. Namely, the passenger restraint force resulting from the airbag body and the seatbelt device is made substantially the same on the left and right by using a simple configuration of merely changing the height position of the other-end portions of the rear tethers, and the passenger restraint performance is improved.

Moreover, an airbag device of a fifth aspect is the airbag device of the third aspect, wherein a length of a rear tether at the non-shoulder belt side is shorter than a length of a rear tether at the shoulder belt side.

In the fifth aspect, the length of the rear tether on the non-shoulder belt side is shorter than the length of the rear tether on the shoulder belt side. This means that the pulling force of the rear tethers is different between left and right, and the pulling force from the rear tethers toward the seat obliquely rearward and downward side with respect to the airbag body or the seat front side portions of the front-rear chambers is greater on the non-shoulder belt side to on the shoulder belt side. Namely, the passenger restraint force resulting from the airbag body and the seatbelt device is made substantially the same on the left and right by a simple configuration of merely changing the length of the rear tethers, and the passenger restraint performance is improved.

An airbag device of a sixth aspect is the airbag device of the third aspect, wherein a force limiter mechanism is installed at the other-end portion of each of the rear tethers, and a withstand load of the force limiter mechanisms is greater at the non-shoulder belt side than at the shoulder belt side.

In the sixth aspect the withstand loads of the force limiter mechanisms installed at the other-end portions of the rear tethers is set so as to be greater on the non-shoulder belt side than on the shoulder belt side. This means that the pulling force of the rear tether is different between the left and right, such that the pulling force from the rear tethers toward the seat obliquely rearward and downward side with respect to the airbag body or the seat front side portions of the front-rear chambers is greater on the non-shoulder belt side than on the shoulder belt side. Namely, as well as the passenger restraint force resulting from the airbag body and the seatbelt device being made substantially the same on the left and right, making the passenger restraint force resulting from the airbag body and the seatbelt device substantially the same on the left and right is easily implementable, and the passenger restraint performance is improved.

A passenger protection device of a seventh aspect includes a vehicle seat for a passenger to sit on, and the airbag device of any one of the first to the sixth aspects installed at a location at a seat rear side of the vehicle seat.

In the seventh aspect, the airbag device is installed at the location at the seat rear side of the vehicle seat for the passenger to sit on. This airbag device is the airbag device of any one of the first to the sixth aspects, and so similar operation and effects to those of the first to the sixth aspects are obtained.

A passenger protection device of an eighth aspect includes an inflator that generates gas at a time of a vehicle collision, an airbag that is supplied with gas generated by the inflator, and that inflates and deploys from a seat rear side of a vehicle seat toward a seat front side via a seat upper side, and a three-point seatbelt device provided at the vehicle seat to restrain a passenger. In an inflated and deployed state the airbag includes a pair of front-rear chambers extending in a seat front-rear direction via left and right sides of the head of a passenger seated in the vehicle seat, an airbag body that is in communication with the pair of front-rear chambers and that is disposed at a seat front side of the passenger, between the pair of front-rear chambers, and a rear tether including a one-end portion attached to the airbag body or to a seat front side portion of a front-rear chamber and an other-end portion attached to a seatback of the vehicle seat or a vehicle body. The rear tether is provided only at a non-shoulder belt side of the seatbelt device such that left and right passenger restraint forces resulting from the airbag body and the seatbelt device are substantially the same. At a time of restraint of the passenger, the airbag body or the seat front side portions of the front-rear chamber is pulled by the rear tether toward a seat obliquely rearward and downward side such that the front-rear chamber presses a shoulder of the passenger from the seat upper side.

In the eighth aspect, the gas generated by the inflator at a time of a vehicle collision is supplied into the airbag, and the airbag is inflated and deployed from the seat rear side of the vehicle seat toward the seat front side via the seat upper side. In an inflated and deployed state the airbag includes the pair of front-rear chambers extending in a seat front-rear direction via left and right sides of the head of a passenger seated in the vehicle seat and the airbag body that is in communication with the pair of front-rear chambers and that is disposed at a seat front side of the passenger, between the pair of front-rear chambers.

The airbag also includes the rear tether including the one-end portion attached to the airbag body or to a seat front side portion of a front-rear chamber, and the other-end portion attached to the seatback of the vehicle seat or the vehicle body. The rear tether is provided only at the non-shoulder belt side of the seatbelt device. Namely, there is no rear tether provided on the shoulder belt side of the seatbelt device. This means that the passenger restraint force resulting from the airbag body and the seatbelt device is substantially the same on the left and right, and the passenger restraint performance is improved.

At a time of restraint of the passenger, the airbag body or the seat front side portions of the front-rear chamber is pulled by the rear tether toward the seat obliquely rearward and downward side such that the front-rear chamber presses the shoulder of the passenger from the seat upper side. The position of the airbag body in the seat height direction with respect to the head of the passenger is accordingly stabilized irrespective of differences in the build of the passenger. Namely, the passenger is appropriately restrained by the airbag irrespective of the build of the passenger.

A passenger protection device of a ninth aspect is the passenger protection device of the eighth aspect, wherein a force limiter mechanism is installed at the other-end portion of the rear tether.

In the ninth aspect, the force limiter mechanism is installed to the other-end portion of the rear tether. This means that making the passenger restraint force resulting from the airbag body and the seatbelt device substantially the same on the left and right is easily implementable, and the passenger restraint performance is improved.

Thus as described above, the present disclosure enables the passenger to be appropriately restrained irrespective of the build of the passenger.

BRIEF DESCRIPTION OF THE DRAWINGS

Exemplary embodiments of the present disclosure will be described in detail based on the following figures, wherein:

FIG. 15 is a schematic side view illustrating an airbag in an airbag device according to a second exemplary embodiment in an inflated and deployed state for a passenger equivalent to an AM50;

DETAILED DESCRIPTION

Figure 1:
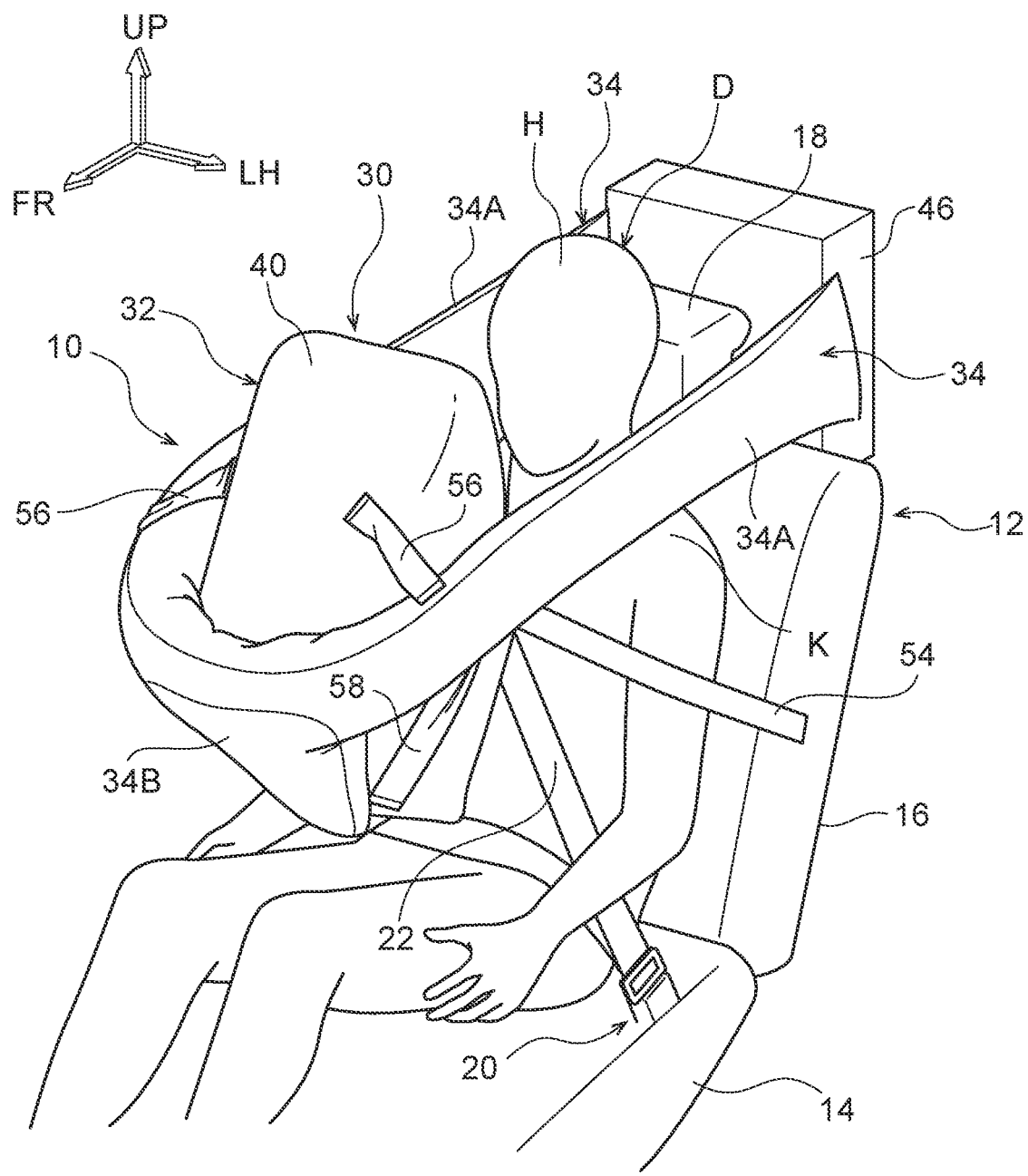
FIG. 1 is a schematic perspective view illustrating an inflated and deployed state of an airbag in an airbag device of a passenger protection device according to a first exemplary embodiment.

Detailed explanation follows regarding exemplary embodiments according to the present disclosure, with reference to the drawings. Note that for ease of explanation, in the drawings an arrow UP indicates an upward direction of a vehicle and a vehicle seat, an arrow FR indicates a forward direction of a vehicle and a vehicle seat, an arrow RH indicates a right direction of a vehicle and a vehicle seat, and an arrow LH indicates a left direction of a vehicle and a vehicle seat. Thus in the following description, unless stated otherwise, reference to up and down, front and rear, and left and right directions indicate up and down, front and rear, and left and right directions of a vehicle and a vehicle seat. Moreover, a left-right direction has the same definition as a vehicle width direction and a seat width direction.

First Exemplary Embodiment

First description follows regarding a first exemplary embodiment. As illustrated in FIG. 1, a passenger protection device 10 according to the first exemplary embodiment is configured including a vehicle seat 12 and an airbag device 30. The vehicle seat 12 is a front seat or a rear seat of a vehicle (automobile). In this example the vehicle seat 12 is a rear seat and not a front seat 13 (see FIG. 8 to FIG. 10). The vehicle seat 12 includes a seat cushion 14, a seatback 16 rotatably provided at a rear edge of the seat cushion 14, and a headrest 18 provided at an upper edge of the seatback 16 so as to be capable of being raised and lowered.

Figure 2:
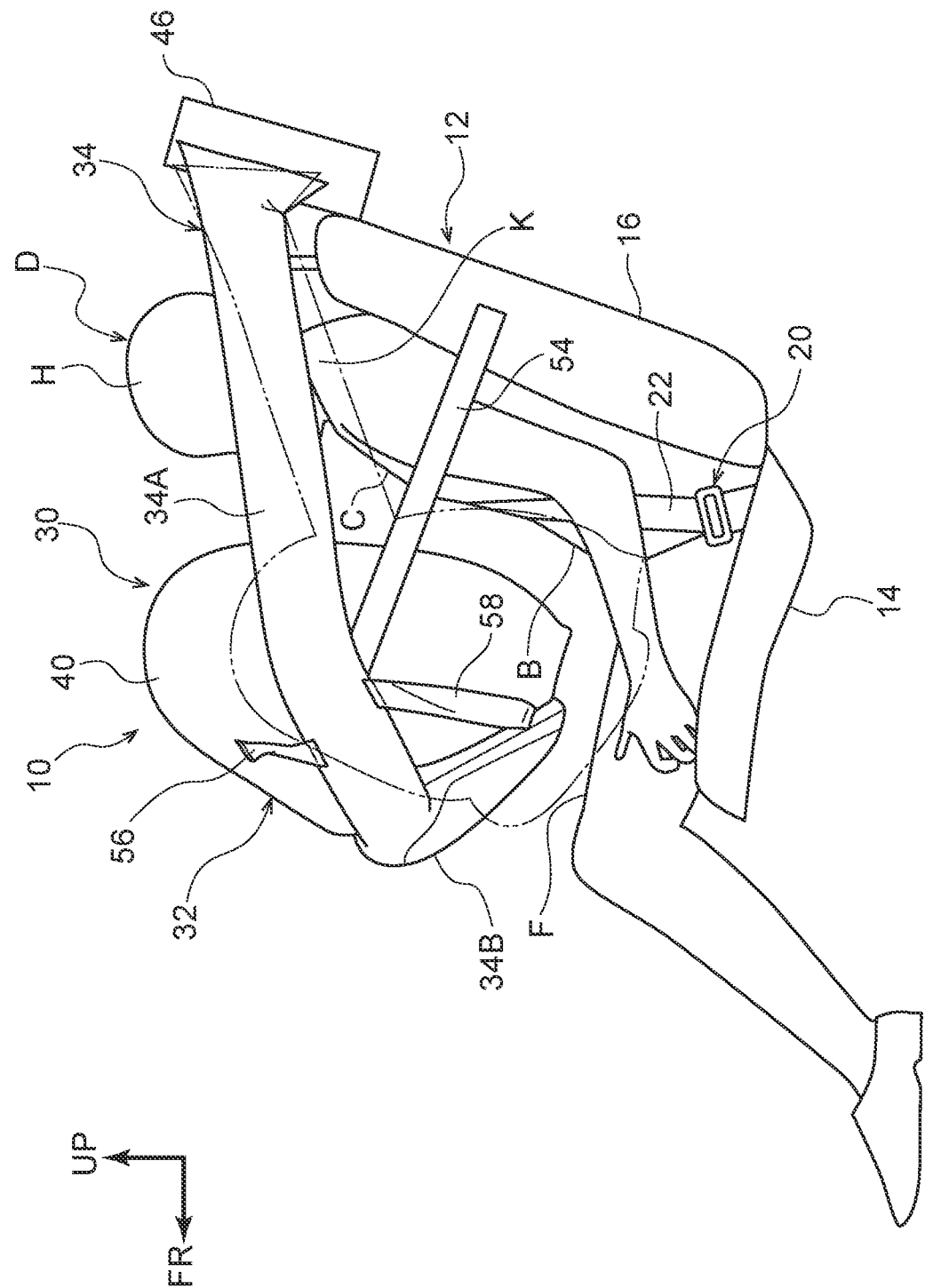
FIG. 2 is a schematic side view illustrating an airbag in an airbag device according to the first exemplary embodiment in inflated and deployed state for a passenger equivalent to an AF05.
Figure 3:
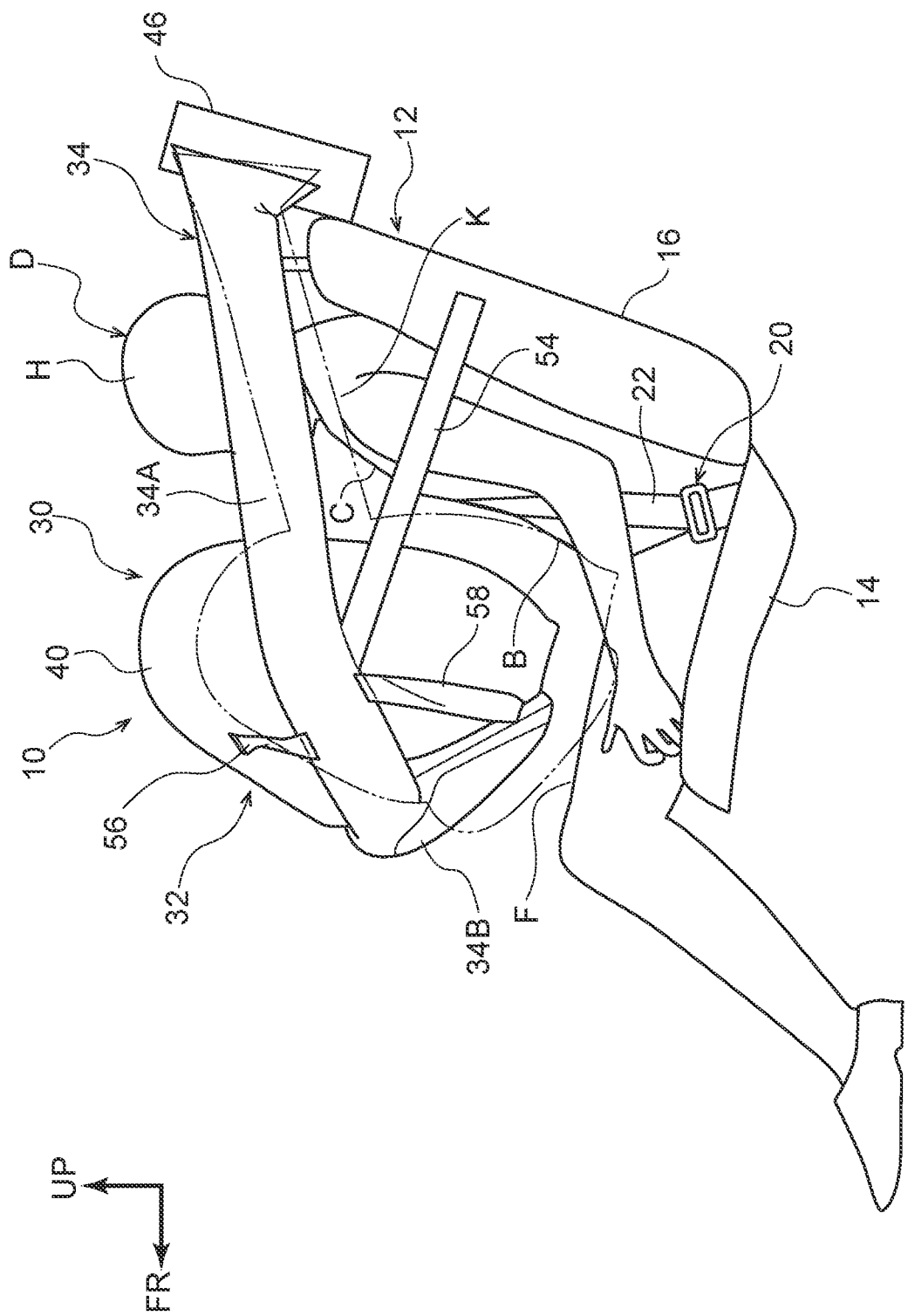
FIG. 3 is a schematic side view illustrating an airbag in an airbag device according to the first exemplary embodiment in inflated and deployed state for a passenger equivalent to an AM50.
Figure 4:
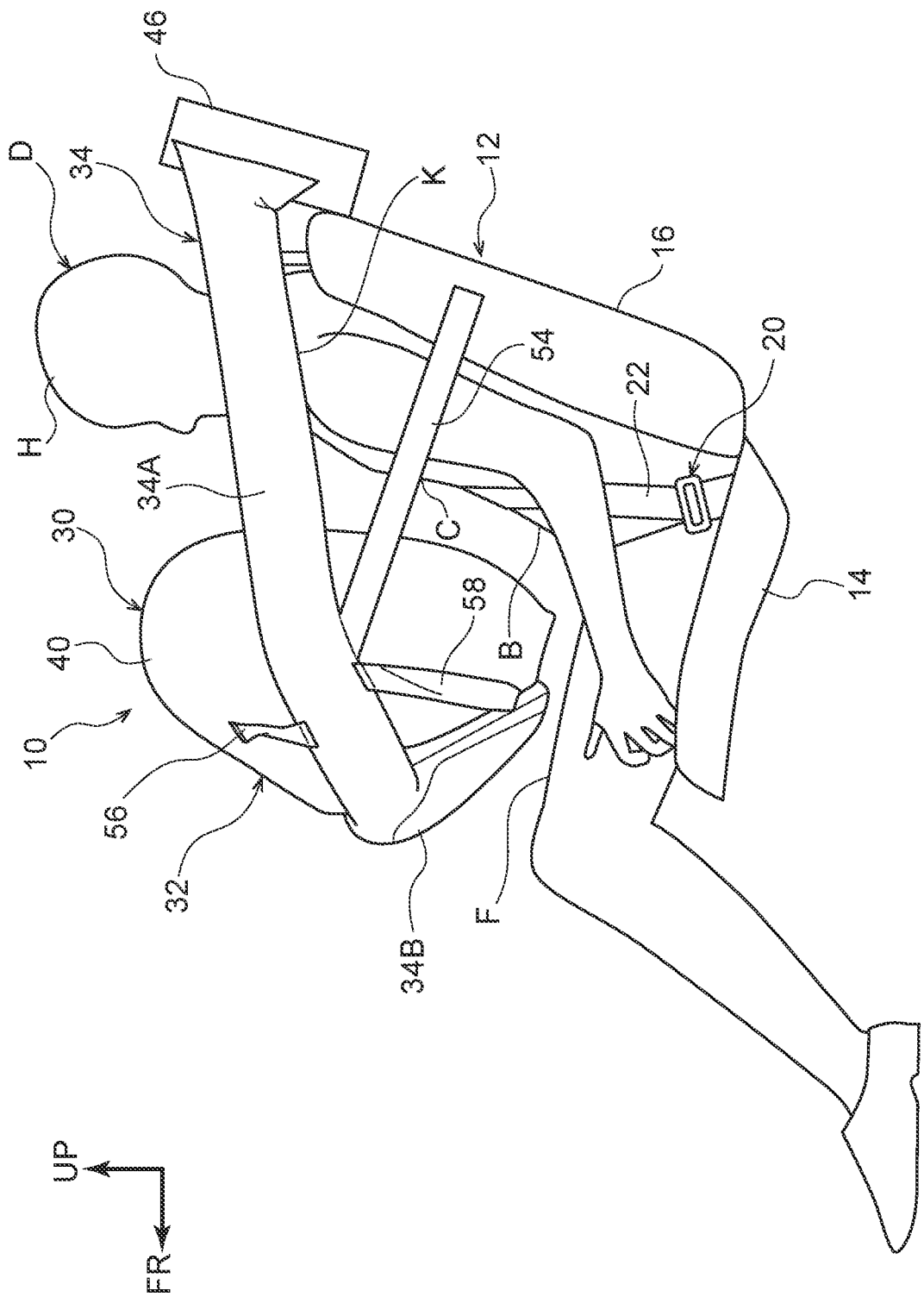
FIG. 4 is a schematic side view illustrating an airbag in an airbag device according to the first exemplary embodiment in an inflated and deployed state for a passenger equivalent to an AM95.
Figure 5:
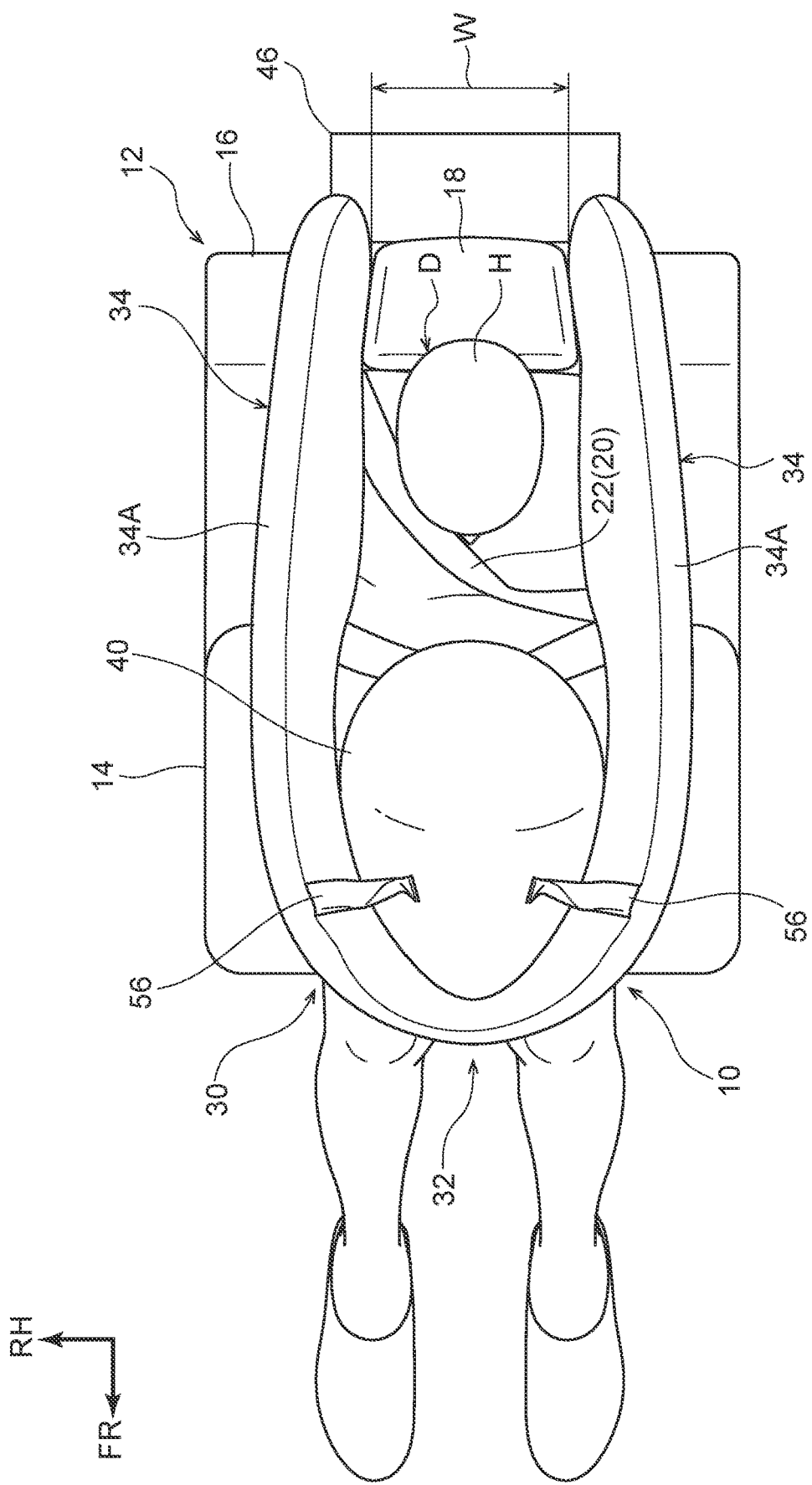
FIG. 5 is a schematic plan view illustrating an airbag in an airbag device according to the first exemplary embodiment in an inflated and deployed state for a passenger equivalent to an AF05.

Note that in FIG. 2 to FIG. 4, as a model of a passenger (seated person) to be protected, a state is illustrated in which crash test dummies (person dummies) D having different respective builds are each seated on the seat cushion 14 of the vehicle seat 12. The dummy D is, for example, a head-on collision test dummy (Hybrid III), and is an American adult female 5 percentile (AF05) illustrated in FIG. 2, an American adult male 50 percentile (AM50) illustrated in FIG. 3, and an American adult male 95 percentile (AM95) illustrated in FIG. 4. Each of the dummies D is seated in a standard seated posture as determined by the crash test method, and the vehicle seat 12 is positioned at a standard installation position corresponding to the seated posture. For ease of explanation, the person dummy D will be called "passenger D" below.

As illustrated in FIG. 1 to FIG. 5, the passenger D seated on the seat cushion 14 of the vehicle seat 12 is configured so as to be restrained in the vehicle seat 12 by a seatbelt 22 provided at a seatbelt device 20. The seatbelt device 20 is a three-point seatbelt device, and is a so-called seat-attached seatbelt device in which a non-illustrated retractor and anchor, and a buckle, are each provided at the vehicle seat 12.

The airbag device 30 includes an airbag 32, a pair of inflators 44 (see FIG. 6), and a module case 46. The airbag 32 is normally housed in a folded-up state inside the module case 46 together with the pair of inflators 44. The module case 46 is formed in a hollow cuboidal shape. The module case 46 is disposed at a rear upper portion of the vehicle seat 12 (more specifically at a rear side of the headrest 18 at an upper side of the seatback 16), and is fixed to an upper edge of the seatback 16 or to a non-illustrated vehicle body.

The airbag 32 is configured so as to be supplied with gas from the pair of the inflators 44 and inflated and deployed (deployed and inflated) from the rear side to the front side of the vehicle seat 12 via at an upper side thereof. The airbag 32 includes a front-rear chamber 34 and an airbag body 40. The front-rear chamber 34 includes a left-right pair of front-rear extension portions 34A that extend along the front-rear direction via left and right sides of a head H of the passenger D, and a coupling portion 34B that connects front end portions of the pair of front-rear extension portions 34A together in a left-right direction. The airbag body 40 inflates and deploys at a rear side of the coupling portion 34B toward the passenger D side (rear side) delayed with respect to the front-rear chamber 34, so as to be disposed between the pair of front-rear extension portions 34A and at a front side of the passenger D.

Figure 6:
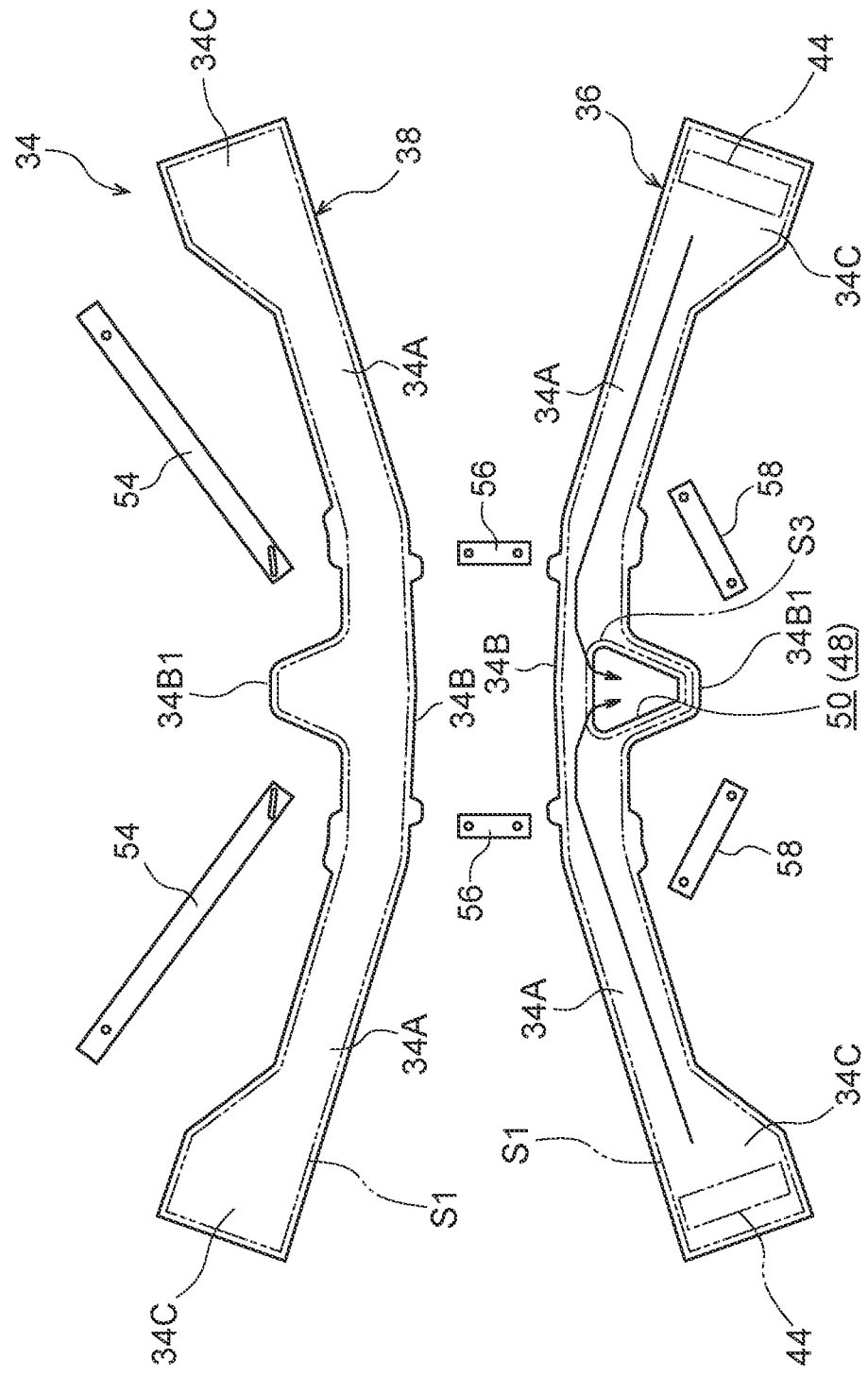
FIG. 6 illustrates an opened out view of a front-rear chamber configuring an airbag of an airbag device according to the first exemplary embodiment.
Figure 7:
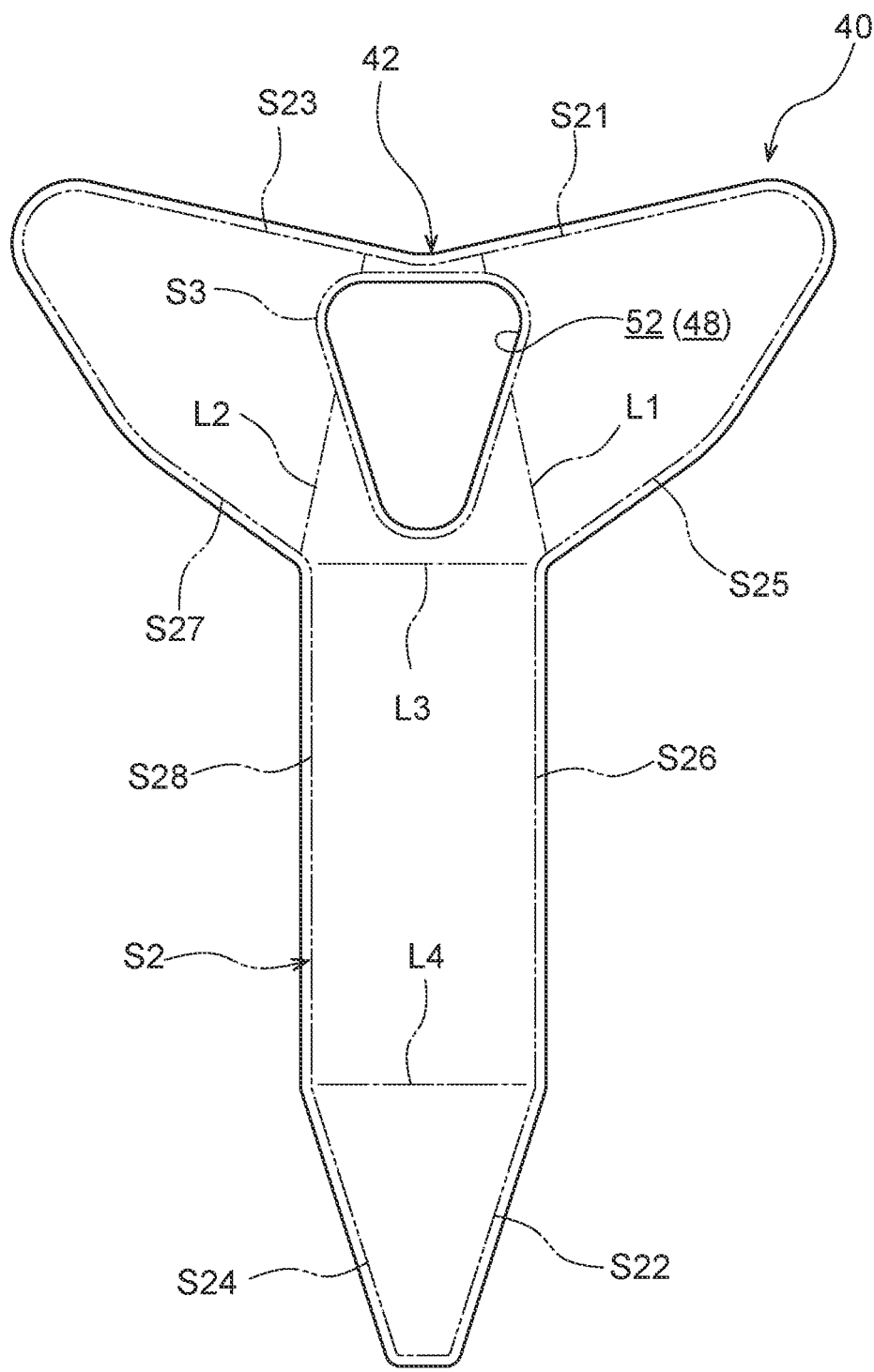
FIG. 7 is an opened out view of an airbag body configuring an airbag of an airbag device according to the first exemplary embodiment.

As illustrated in FIG. 6, the front-rear chamber 34 is formed in an elongated bag shape by overlapping two long base cloth 36, 38 and sewing peripheral edges thereof together along a sewn portion S1. Moreover, as illustrated in FIG. 7, the airbag body 40 is formed in a bag shape by folding a single base cloth 42 along four fold lines L1, L2, L3, L4 and sewing along a sewn portion S2.

At the sewn portion S2, a sewing line S21 is sewn to a sewing line S22, a sewing line S23 is sewn to a sewing line S24, a sewing line S25 is sewn to a sewing line S26, and a sewing line S27 is sewn to a sewing line S28. Note that the base cloths 36, 38, 42 are, for example, configured by a polyamide- or polyester-based fabric. One or both of the two base cloths 36, 38 configuring the front-rear chamber 34 is a base cloth that is less extensible than the base cloth 42 configuring the airbag body 40.

As illustrated in FIG. 6, the length direction two end portions (rear end portions of the pair of front-rear extension portions 34A) of the front-rear chamber 34 configure a pair of inflator housing portions 34C housing the left-right pair of inflators 44. Namely, a length direction central portion of the front-rear chamber 34 (a portion connecting the front end portions of the pair of front-rear extension portions 34A together in the left-right direction) is configured by the coupling portion 34B, with the respective front-rear extension portions 34A disposed between the coupling portion 34B and the pair of inflator housing portions 34C.

Although omitted in the drawings, the airbag device 30 includes a control device (ECU) for controlling actuation of the pair of inflators 44. The control device is electrically connected to the pair of inflators 44 and to a non-illustrated crash sensor (including a camera or the like), and is configured so as to be able to detect a head-on collision of the vehicle or foresee that a head-on collision is inevitable (hereafter referred to as "predict"). The control device is configured so as to actuate the pair of inflators 44 when a head-on collision of the vehicle is detected or predicted based on information from the crash sensor.

The pair of inflators 44 are, for example, combustion type or cold-gas type cylinder inflators, configured so as to generate gas on actuation by the control device at a time of a vehicle head-on collision. Note that the form of vehicle head-on collision for which the control device actuates the inflators 44 includes, in addition to a full frontal head-on collision, an offset head-on collision, such as an oblique collision or a small overlap collision or the like.

The pair of inflator housing portions 34C housing the pair of inflators 44 are disposed separated from each other at the left and right sides inside the module case 46. Each of the inflators 44 housed inside the respective inflator housing portions 34C is disposed with an axial direction orientated along the height direction of the seatback 16. An upper and lower pair of stud bolts (omitted in the drawings) are, for example, provided at each of the inflators 44.

The pair of stud bolts are inserted through the inflator housing portions 34C, the module case 46, and through a non-illustrated frame of the seatback 16, and nuts (omitted in the drawings) are screwed onto the respective stud bolts. The inflator housing portions 34C, the inflators 44, and the module case 46 are thereby fixed to the frame of the seatback 16.

The pair of front-rear extension portions 34A are each formed in an elongated tube shape. An enlarged portion 34B1 is integrally formed to a left-right direction central portion of the coupling portion 34B, with the enlarged portion 34B1 projecting further downward than the left-right direction two end portions of the coupling portion 34B connected to the pair of front-rear extension portions 34A. Namely, the coupling portion 34B is formed as a substantially T-shaped bag in communication with the front-rear extension portions 34A. A configuration is adopted in which a communication hole 48 is provided at a rear side of the left-right direction central portion of the coupling portion 34B including the enlarged portion 34B1.

Namely, a sewn portion S3 is formed by sewing around a periphery of a through hole 50 formed in the base cloth 36 of the front-rear chamber 34 and around a periphery of a through hole 52 (see FIG. 7) formed in the base cloth 42 of the airbag body 40, with the communication hole 48 formed so as to communicate between the through hole 50 and the through hole 52. Note that the through hole 50 and the through hole 52 are, as an example, formed in substantially inverted trapezoidal shapes. This means that the sewn portion S3 is, as an example, also formed in a substantially inverted trapezoidal shape, such that the communication hole 48 communicating the inside of the coupling portion 34B with the inside of the airbag body 40 is positioned at the inside of the sewn portion S3.

The pair of front-rear extension portions 34A, the coupling portion 34B, and the airbag body 40 are normally housed folded up inside the module case 46 with a specific folding pattern, such as roll folding, concertina folding, or the like. A non-illustrated tear line is formed to the module case 46. The tear line is configured so as to rupture on receipt of inflation pressure of the airbag 32 when the airbag 32 is being inflated and deployed. This means that the airbag 32 is able to be inflated and deployed toward the outside of the module case 46 in a sequence of the pair of front-rear extension portions 34A, then the coupling portion 34B, and then the airbag body 40.

As illustrated in FIG. 2 to FIG. 5, the inflated and deployed pair of front-rear extension portions 34A extend in the front-rear direction at the left and right sides of the head H of the passenger D, so as to oppose the head H from the left and right sides thereof, separated from the head H by respective gaps. The front end portions of the inflated and deployed pair of front-rear extension portions 34A are in a state connected together in the left-right direction by the inflated and deployed coupling portion 34B. This means that the front-rear chamber 34 including the pair of front-rear extension portions 34A and the coupling portion 34B is configured in a substantially U-shape open toward the rear in plan view (see FIG. 5).

The airbag body 40 is configured so as to be supplied with gas through the communication hole 48 and inflated and deployed toward the rear side (the passenger D side). Namely, the airbag body 40 is configured so as to be inflated and deployed at the rear side of the coupling portion 34B toward the passenger D side (rear side) delayed with respect to the front-rear chamber 34. The airbag body 40 is thereby configured so as to be able to pass through from the rear side toward the front side via a gap between the head H of the passenger D and a ceiling 28 of a vehicle cabin (see FIG. 8) at a time of inflation and deployment of the front-rear chamber 34.

The inflated and deployed airbag body 40 is configured so as to face toward the head H, the chest C, and the belly B of the passenger D, separated by a gap therefrom in the front-rear direction (see FIG. 2 to FIG. 4, and FIG. 11). Note that the airbag body 40 is set with a shape such that when being inflated and deployed, the airbag body 40 is sandwiched between the thighs F and the chest C of the passenger D from an intermediate-stage to a later-stage at a time of passenger restraint.

Moreover, as illustrated in FIG. 1 and FIG. 6, a left and right pair of rear tethers 54, a left and right pair of front upper tethers 56, and a left-right pair of front lower tethers 58 are attached to the airbag 32. The rear tethers 54, the front upper tethers 56, and the front lower tethers 58 are, for example, configured in rectangular belt shapes from a polyamide- or polyester-based fabric. The fabric configuring the rear tethers 54, the front upper tethers 56, and the front-lower tethers 58 is configured so as to be less extensible than the base cloths 36, 38 configuring the front-rear chamber 34 and the base cloth 42 configuring the airbag body 40. The extensibility is adjusted by the substance, thickness, and the like of the fabric.

The pair of front upper tethers 56 are configured so as to couple wall faces at the left and right sides of a front side of an upper portion of the airbag body 40 inflated and deployed further upward than the front-rear chamber 34, to respective front portions of the pair of front-rear extension portions 34A. Namely, respective one-end portions of the pair of front upper tethers 56 are sewn to wall faces of the left and right sides of the front side of the upper portion of the airbag body 40 inflated and deployed further upward than the front-rear chamber 34. Each of the other-end portions of the pair of front upper tethers 56 is sewn to the front portions of the pair of respective front-rear extension portions 34A.

The pair of front-lower tethers 58 are configured so as to couple wall faces at the left and right sides of a front side of a lower portion of the airbag body 40 inflated and deployed further downward than the front-rear chamber 34, to respective front portions of the pair of front-rear extension portions 34A. Namely, each of the one-end portions of the pair of front-lower tethers 58 is sewn to the respective wall faces at the left and right sides of the lower portion of the airbag body 40 inflated and deployed further downward than the front-rear chamber 34. Each of the other-end portions of the pair of front-lower tethers 58 is sewn to the front portions of the pair of respective front-rear extension portions 34A.

Moreover, each of one-end portions of the pair of rear tethers 54 is attached to the airbag body 40 by being sewed to the respective wall faces on the left and right sides at a front side of a lower portion of the airbag body 40 inflated and deployed further downward than the front-rear chamber 34. Each of the other-end portions of the pair of rear tethers 54 is attached to respective side portions of the seatback 16 (or to a non-illustrated vehicle body at a rear side of the passenger D). Thus in an inflated and deployed state of the airbag 32, the pair of rear tethers 54 extend obliquely rearward and downward at a lower side of the pair of front-rear extension portions 34A.

Namely, the pair of rear tethers 54 adopt an inclined orientation facing obliquely rearward and downward in side view. This results in a configuration in which, at a time of restraint of the passenger D by the airbag 32, the airbag body 40 is pulled (drawn) relatively rearward and downward by the pair of rear tethers 54, and the airbag body 40 and front portions of the pair of front-rear extension portions 34A are pulled relatively rearward and downward about a center of rotation of the module case 46.

At a time of restraint of the passenger D by the airbag 32, the airbag body 40 and the front portions of the pair of front-rear extension portions 34A are pulled (drawn) relatively obliquely rearward and downward by the pair of rear tethers 54 such that a lower face of the pair of front-rear extension portions 34A abuts left and right shoulders K of the passenger D (see FIG. 1 to FIG. 4; illustrated by the double-dash broken line in FIG. 2 and FIG. 3), and the pair of front-rear extension portions 34A are configured to press the left and right shoulders K of the passenger D with a specific pressure in a direction from the upper side toward the lower side.

Note that the length, the attachment positions of each of the other-end portions, and the like of the pair of rear tethers 54, are set such that the pair of front-rear extension portions 34A are able to press the left and right shoulders K of the passenger D in the direction from the upper side toward the lower side irrespective of the build of the passenger D (in other words, even for a passenger having a small build D equivalent to the AF05 illustrated in FIG. 2, even for a standard build passenger D equivalent to the AM50 illustrated in FIG. 3, and even for a large build passenger D equivalent to the AM95 illustrated in FIG. 4).

Moreover, a width W between inside faces of the pair of front-rear extension portions 34A is the smallest shoulder width from out of the shoulder widths of each of the passengers D of the three types of build described above such that the pair of front-rear extension portions 34A do not come off toward the seat width direction outside from the left and right shoulders K of the passenger D irrespective of the build of the passenger D. Namely, the width W between the inside faces of the pair of front-rear extension portions 34A is the shoulder width of a passenger having a small build D equivalent to the AF05 (for example, from 400 mm to 500 mm, or from 400 mm to about 450 mm) (see FIG. 5).

Next, description follows regarding operation and effects of the airbag device 30 and the passenger protection device 10 according to the first exemplary embodiment configured as described above.

The pair of inflators 44 are actuated under control from the control device when a vehicle head-on collision is detected (or predicted) by the crash sensor. Namely, gas is ejected from each of the inflators 44 into the pair of inflator housing portions 34C. The gas generated inside the pair of inflator housing portions 34C flows to the coupling portion 34B side via the pair of front-rear extension portions 34A, and is supplied into the airbag body 40 via the communication hole 48.

Figure 8:
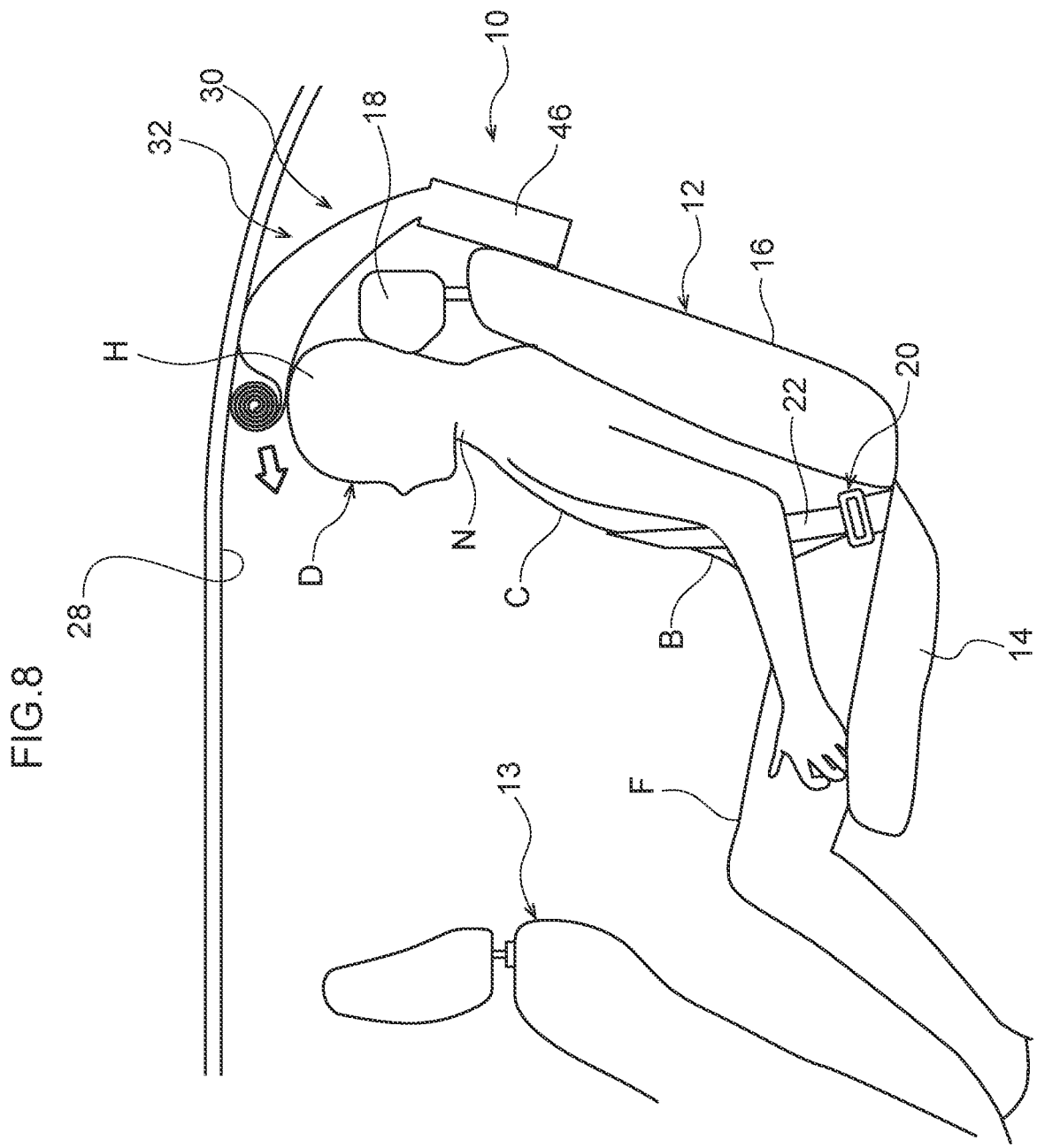
FIG. 8 is a schematic side view illustrating a state when an airbag of an airbag device according to the first exemplary embodiment passes through a gap between a head of a passenger and a ceiling of a vehicle cabin while inflating and deploying.

More specifically first, as illustrated in FIG. 8, the tear line of the module case 46 ruptures under receipt of inflation pressure of the airbag 32, and the airbag 32 inflates and deploys from the rear side of the vehicle seat 12 toward the front side via an upper side thereof (as indicated by an arrow). Namely, the airbag 32 deploys from a rear upper portion of the seatback 16 toward the front side via an upper side of the headrest 18 and an upper side of the head H of the passenger D.

Figure 9:
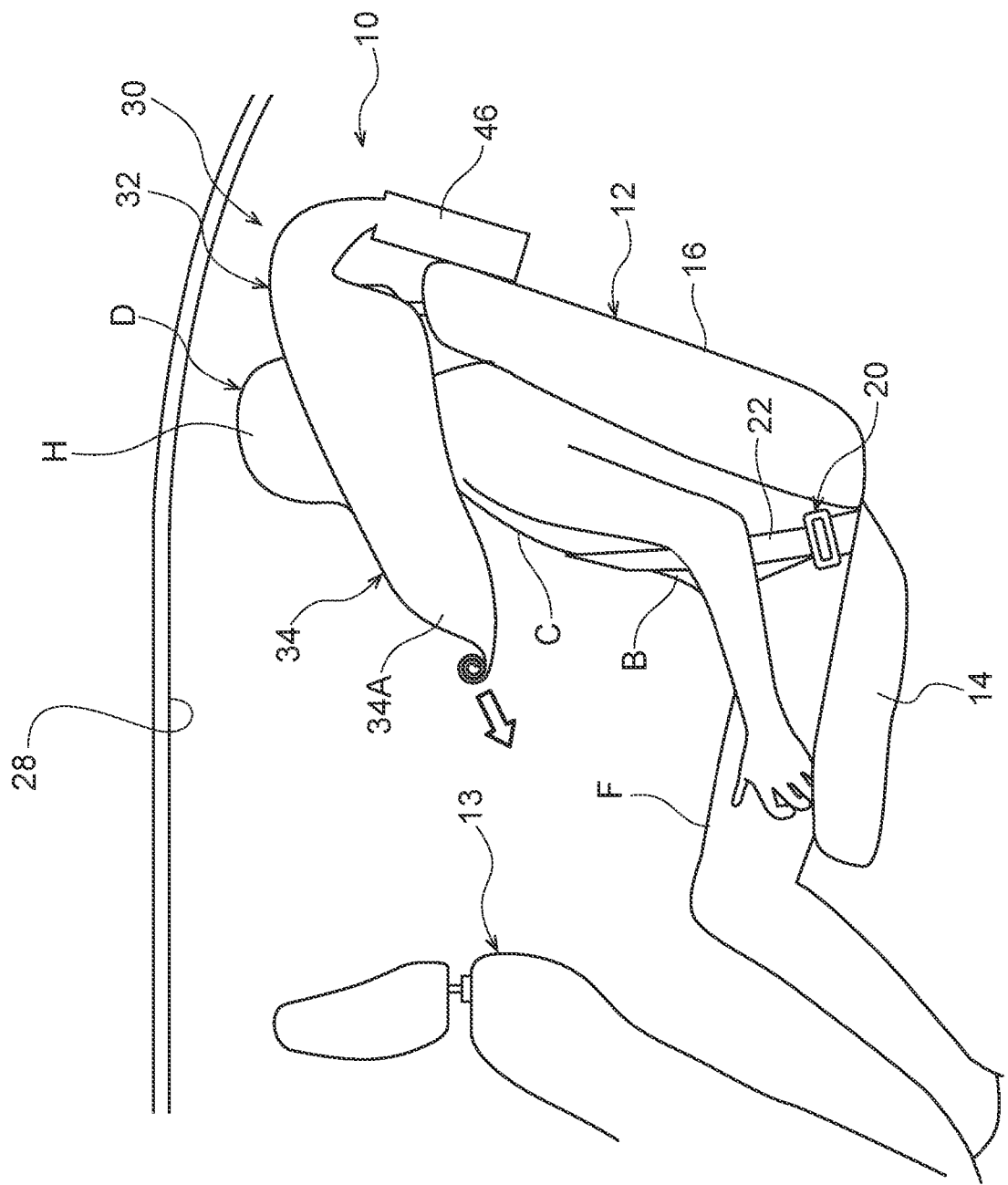
FIG. 9 is a schematic side view illustrating a state when an airbag of an airbag device according to a first exemplary embodiment passes the shoulders of a passenger while inflating and deploying.
Figure 10:
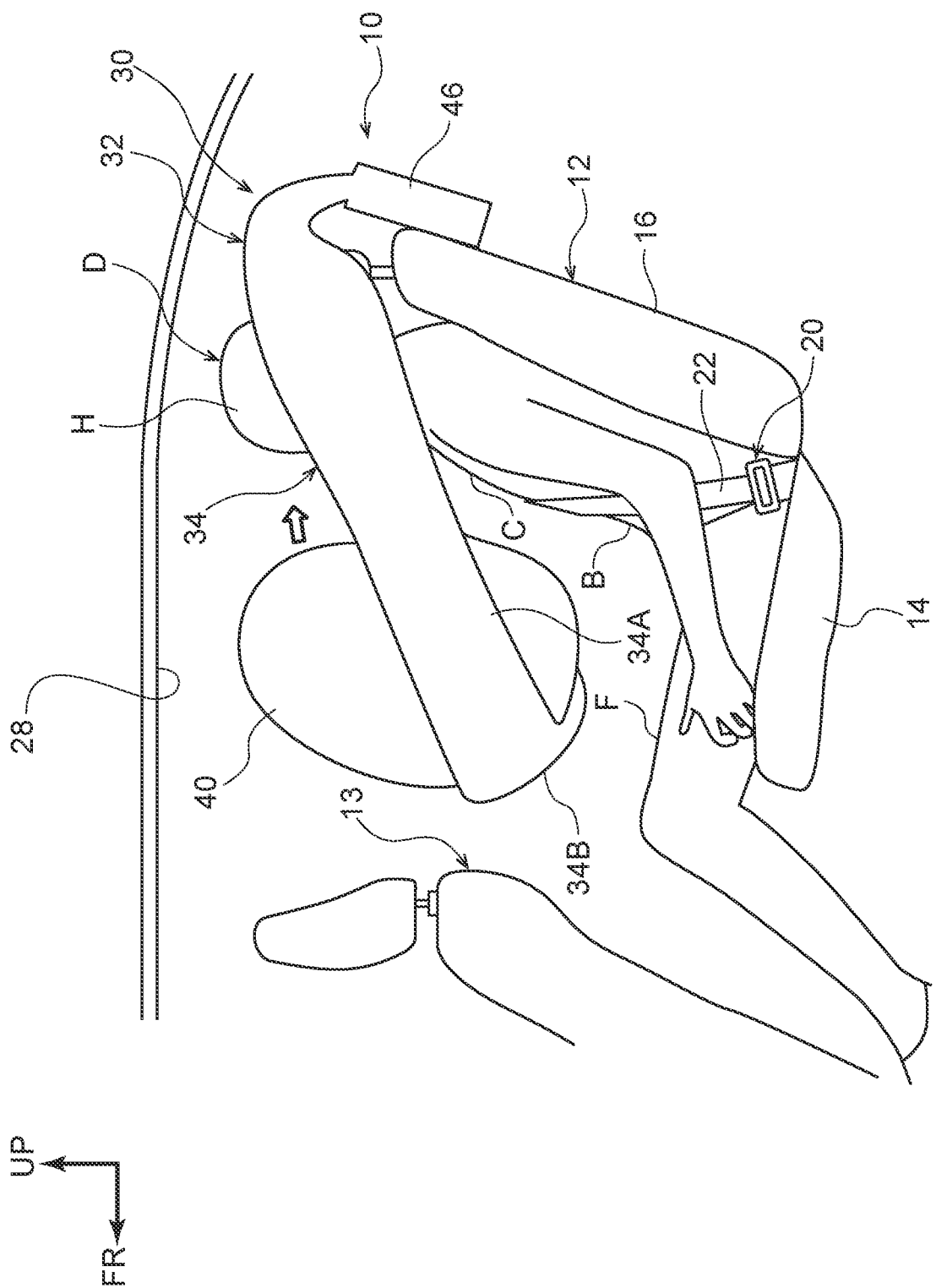
FIG. 10 is a schematic side view illustrating a state when an airbag of an airbag device according to the first exemplary embodiment has become disposed at a front side of a passenger while inflating and deploying.

Next, as illustrated in FIG. 9, the head H of the passenger D is inserted relatively into a space surrounded by the front-rear extension portions 34A of the pair of front-rear chambers 34 and by the airbag body 40 (see FIG. 10). Namely, the front-rear extension portions 34A of the pair of front-rear chambers 34 are deployed toward the front side (as indicated by the arrow) while being disposed at the left and right sides of the head H of the passenger D.

Figure 11:
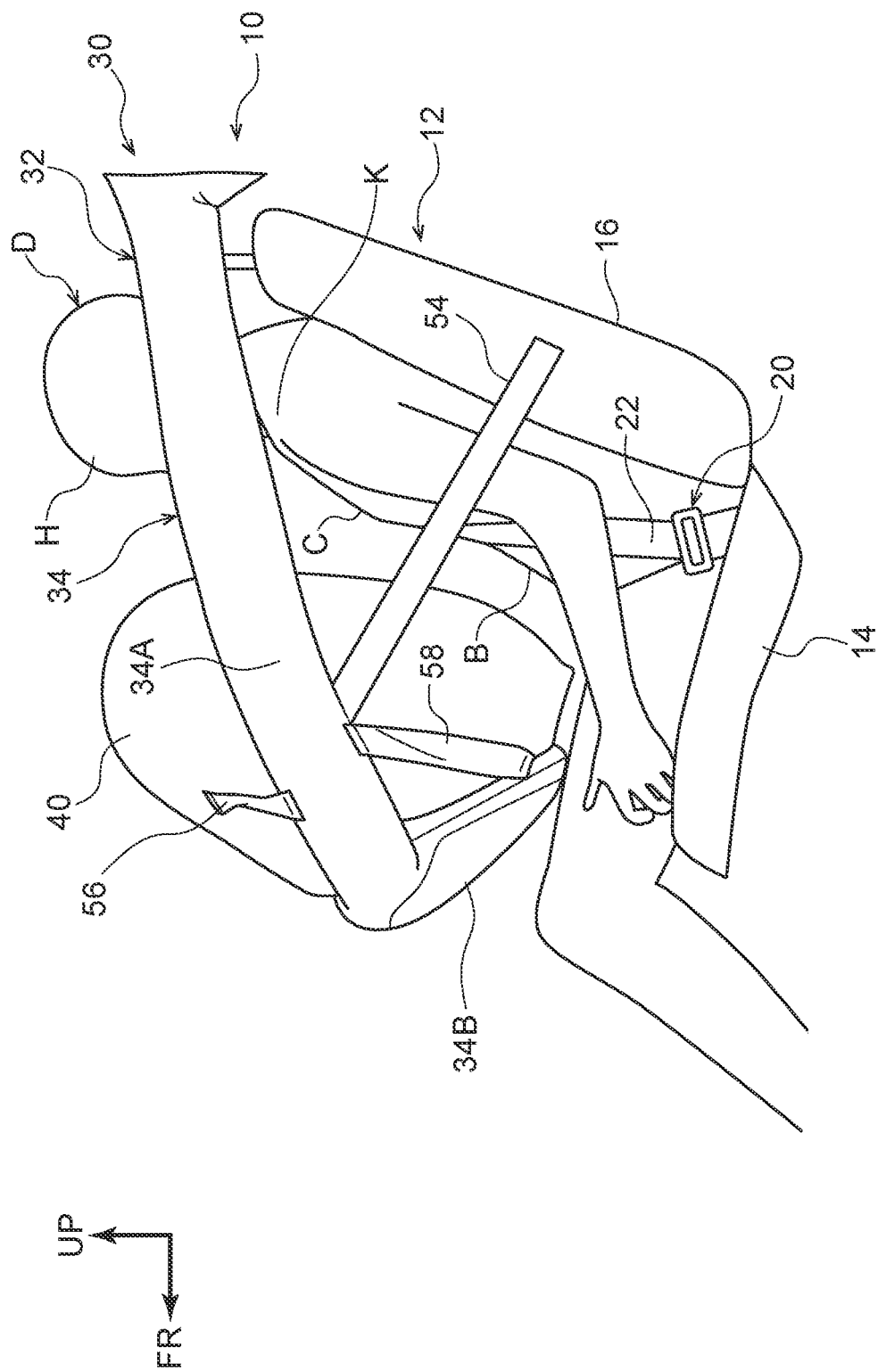
FIG. 11 is a schematic side view illustrating a time after complete inflation and deployment of an airbag of an airbag device according to the first exemplary embodiment.

Then, as illustrated in FIG. 10, the airbag body 40 is inflated and deployed toward the passenger D side (rear side as indicated by an arrow) by being supplied with gas through the coupling portion 34B connecting the front end portions of the front-rear extension portions 34A of the pair of front-rear chambers 34 together in the left-right direction. Namely, as illustrated in FIG. 11, the airbag body 40 is disposed between the pair of front-rear chambers 34 and at the front side of the passenger D.

Note that at a time of inflation and deployment of the airbag body 40, the pair of front upper tethers 56 respectively couple left-right side locations at the front side of an upper portion of the airbag body 40 to the front portions of the pair of front-rear extension portions 34A. The pair of front upper tethers 56 enable unintended upward displacement (rotation) of the airbag body 40 with respect to the front-rear chamber 34 about the coupling portion 34B to be suppressed when the airbag body 40 (the airbag 32) has been completely inflated and deployed.

Moreover, at a time of inflation and deployment of the airbag body 40, the pair of front-lower tethers 58 couple locations at the left-right side of a front side of the lower portion of the airbag body 40 to the front portions of the pair of front-rear extension portions 34A. The pair of front-lower tethers 58 are able to suppress unintended downward displacement (rotation) of the airbag body 40 with respect to the front-rear chamber 34 about the coupling portion 34B when the airbag body 40 (the airbag 32) has been completely inflated and deployed.

The pair of rear tethers 54 also extend obliquely rearward and downward at a lower side of the pair of front-rear extension portions 34A when the airbag 32 has been completely inflated and deployed. Namely, the pair of rear tethers 54 limit the airbag body 40 from moving obliquely forward and upward. This accordingly enables the airbag 32 to be suppressed from swinging in the height direction and in the front-rear direction (contributes to the stability of the deployment behavior of the airbag body 40), and the lower faces of the front-rear extension portions 34A of the pair of front-rear chambers 34 abut the upper side of the left and right shoulders K of the passenger D (see FIG. 2 to FIG. 4).

Figure 12:
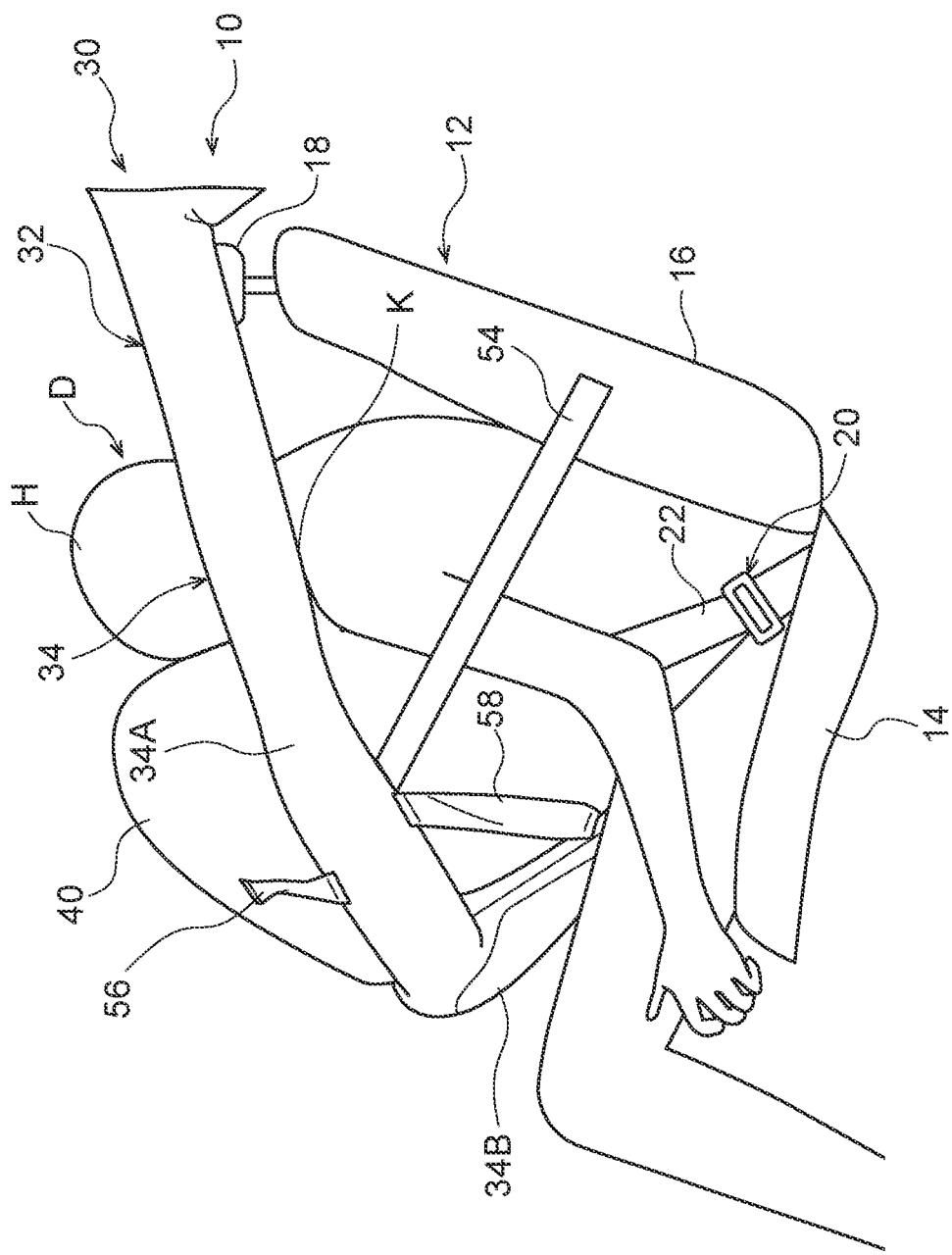
FIG. 12 is a schematic side view illustrating a time at an initial-stage of passenger restraint by an airbag of an airbag device according to the first exemplary embodiment.
Figure 13:
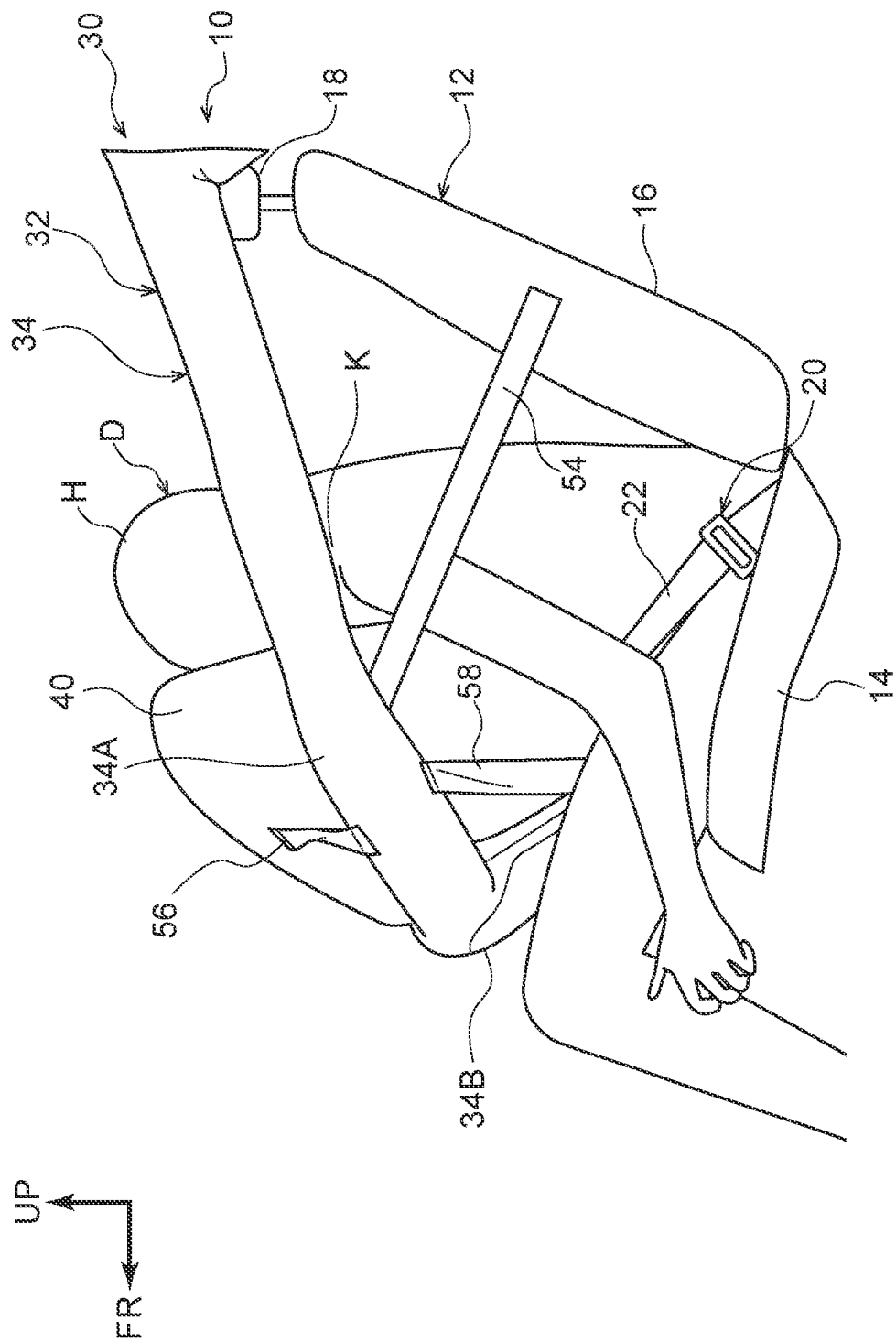
FIG. 13 is a schematic side view illustrating a time at an intermediate-stage of passenger restraint by an airbag of an airbag device according to the first exemplary embodiment.
Figure 14:
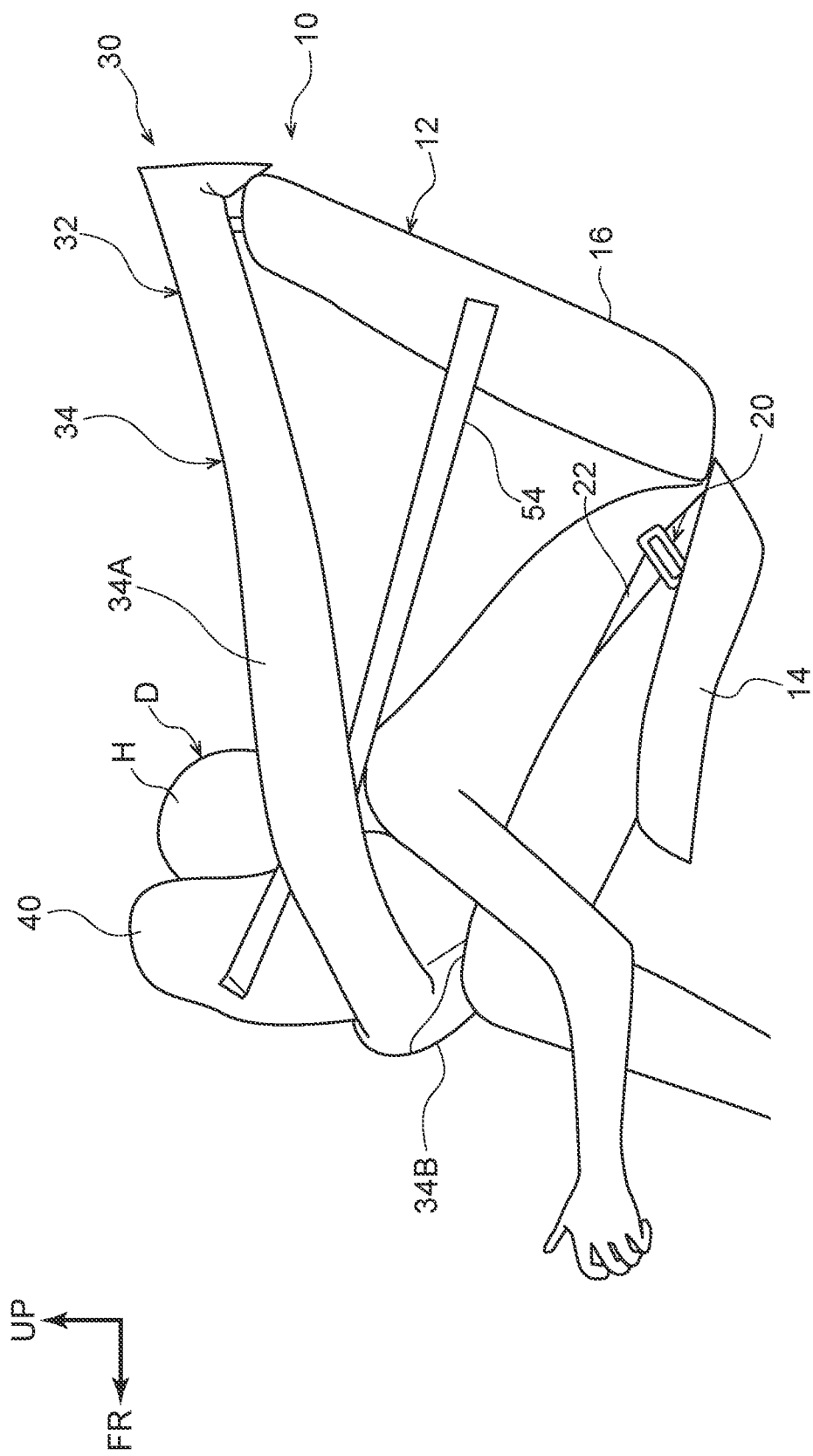
FIG. 14 is a schematic side view illustrating a time at a later-stage of passenger restraint by an airbag of an airbag device according to the first exemplary embodiment.

In this state, as illustrated in FIG. 12, the passenger D who has moved toward the front side under inertia from the impact of the vehicle head-on collision is restrained by the airbag body 40. More specifically, as illustrated in FIG. 13, at a time of restraint of the passenger D, the front-rear chambers 34 (the front-rear extension portions 34A) are stretched toward the front side by the passenger D moving toward the front side. Then, as illustrated in FIG. 14, the airbag body 40 is compression deformed toward the front side by being pressed toward the front side by the passenger D.

This accordingly enables the energy absorption performance of the airbag body 40 to be improved. Namely, in cases in which both the front-rear chamber 34 and the airbag body 40 receive tension load, the load from the airbag body 40 imparted to the passenger D increases continuously with time, however the load imparted to the passenger D can be decreased somewhat by compression deformation of the airbag body 40.

Moreover, the airbag body 40 is set with a shape so as to be sandwiched between the thighs F and the chest C of the passenger D from an intermediate-stage to a later-stage at a time of passenger restraint by the airbag 32, and so this enables contact with the upper body of the passenger D over a wide surface area. The load from the airbag body 40 imparted to the passenger D can accordingly be reduced significantly.

The airbag body 40 is also inflated and deployed toward the passenger D side at the rear side of the coupling portion 34B after the inflation and deployment of the front-rear chamber 34, and so a gap between the airbag body 40 and the passenger D becomes small. The passenger D is thereby restrained at an early-stage by the airbag body 40, enabling the initial-stage passenger D restraint performance by the airbag body 40 to be improved.

Moreover, gas is supplied from the inflators 44 into the airbag body 40 through the communication hole 48 formed at the rear side of the left-right direction central portion of the coupling portion 34B in an inflated and deployed state of the front-rear chamber 34. Namely, gas that was ejected from the inflators 44 and flowed into the pair of front-rear extension portions 34A of the front-rear chamber 34 and the coupling portion 34B is supplied into the airbag body 40 via the communication hole 48.

This thereby enables the airbag body 40 to be inflated and deployed sufficiently delayed with respect to the front-rear chamber 34. Namely, the airbag body 40 can be easily inflated and deployed toward the rear side after passing from the rear side to the front side via the narrow gap between the head H of the passenger D and the ceiling 28 of the vehicle cabin due to the inflation and deployment of the front-rear chamber 34 (see FIG. 8 to FIG. 10). This enables the airbag body 40 to be prevented from getting stuck in the narrow gap, enabling a deployment malfunction with the airbag 32 to be suppressed or prevented from occurring.

At a time of restraint of the passenger D, the airbag body 40 is pulled relatively obliquely rearward and downward by the rear tethers 54. Namely, the pair of rear tethers 54 are stretched in the front-rear direction together with the front-rear chamber 34 at a time of passenger restraint by the airbag body 40, and together with the front-rear chamber 34, bear and support load imparted from the passenger D to the airbag body 40.

As a result thereof, the front-rear extension portions 34A of the front-rear chamber 34 abut the shoulders K of the passenger D, enabling the shoulders K to be pressed from the upper side toward the lower side with the specific pressure (see FIG. 2 to FIG. 4). This thereby enables the height direction position of the airbag body 40 with respect to the head H of the passenger D to be stabilized (so as not to change greatly) irrespective of the build of the passenger D.

This thereby enables neck retroflexion with respect to the chest C due to airbag body 40 pushing the head H too strongly to be suppressed or prevented from occurring for a passenger having a small build D, for example equivalent to the AF05. Bottoming out against the front seat 13 (see FIG. 8 to FIG. 10) due to insufficient pressing force of the airbag body 40 against the head H can also be suppressed or prevented from occurring for a large build passenger D, for example equivalent to the AM95. Namely, the airbag 32 enables the passenger D to be appropriately restrained irrespective of the build of the passenger D.

Moreover, due to the width W between the inside faces of the front-rear extension portions 34A of the pair of front-rear chambers 34 being the shoulder width of the small build passenger D equivalent to the AF05 (for example, from 400 mm to 500 mm, or from 400 mm to about 450 mm), there is no concern that the pair of front-rear extension portions 34A might come off from the left and right shoulders K of the passenger D, irrespective of differences in the build of the passengers D. Namely, the shoulders K of the passenger D can be pressed with certainty from the upper side by the front-rear extension portions 34A of the front-rear chamber 34 at a time of restraint of the passenger D, irrespective of the build of the passenger D. This thereby enables the passenger D to be certainly and appropriately restrained by the airbag 32.

Second Exemplary Embodiment

Next, description follows regarding a second exemplary embodiment. Note that the same reference numerals will be appended to locations equivalent to those of the first exemplary embodiment and detailed explanation thereof will be omitted (including of common operation and effects).

In the second exemplary embodiment, the pulling forces from the rear tethers 54 relative obliquely rearward and downward with respect to the airbag body 40 are set so as to be greater on the non-shoulder belt side (the side not having the seatbelt 22 across the shoulder K) than on the shoulder belt side (the side having the seatbelt 22 across the shoulder K) of the seatbelt 22 in the seatbelt device 20, such that the left and right passenger restraint forces resulting from both the airbag body 40 and the three-point seatbelt device 20 become substantially the same.

More specifically, as illustrated in FIG. 15, a height position of an other-end portion of a rear tether 54 at the non-shoulder belt side (left side), is higher than the height position of an other-end portion of a rear tether 54 at the shoulder belt side (right side) (illustrated by the dashed-line in FIG. 15). This thereby makes the obliquely rearward and downward pulling angles by the rear tether 54 different (changes the pulling angle) on the left and right, such that although there is a decrease in the withstand load for the height direction at the non-shoulder belt side rear tether 54 on the non-shoulder belt side, an increase can be achieved in the withstand load for the front-rear direction (illustrated by the dashed-lines in FIG. 16B).

Figure 16A:
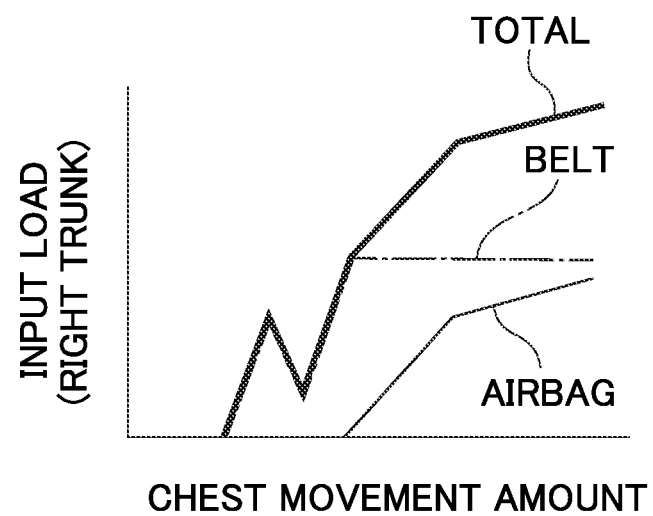
FIG. 16A is a graph illustrating a relationship of input load on a shoulder belt side (right trunk side) according to the second exemplary embodiment to a chest movement amount.
Figure 16B:
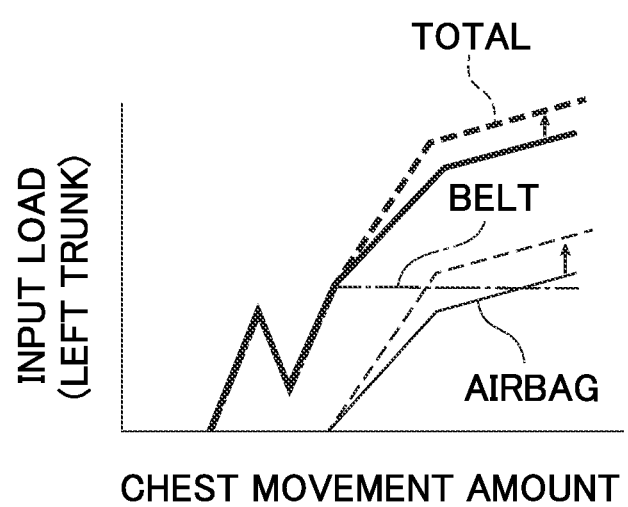
FIG. 16B is a graph illustrating a relationship of input load on a non-shoulder belt side (left trunk side) according to the second exemplary embodiment to a chest movement amount.

Namely, pulling force from the rear tether 54 on the non-shoulder belt side can be made greater than the pulling force from the rear tether 54 on the shoulder belt side. Thus, as illustrated in FIG. 16A and FIG. 16B, the passenger restraint force resulting from the airbag body 40 and the seatbelt device 20 can be adjusted so as to be substantially the same on the left and right, enabling a good balance to be achieved between the left and right restraint of the passenger D, and particularly with respect to the upper body thereof. The second exemplary embodiment thereby enables passenger restraint performance to be improved with a simple configuration merely by changing a height position of the other-end portions of the rear tethers 54.

Third Exemplary Embodiment

Next, description follows regarding a third exemplary embodiment. Note that the same reference numerals will be appended to locations equivalent to those of the first exemplary embodiment and the second exemplary embodiment and detailed explanation thereof will be omitted (including of common operation and effects).

In the third exemplary embodiment too, in order to make the passenger restraint force resulting from the airbag body 40 and the three-point seatbelt device 20 substantially the same on the left and right, the pulling force from the rear tethers 54 relatively obliquely rearward and downward with respect to the airbag body 40 is set so as to be greater on the non-shoulder belt side than on the shoulder belt side of the seatbelt 22 of the seatbelt device 20.

Figure 17:
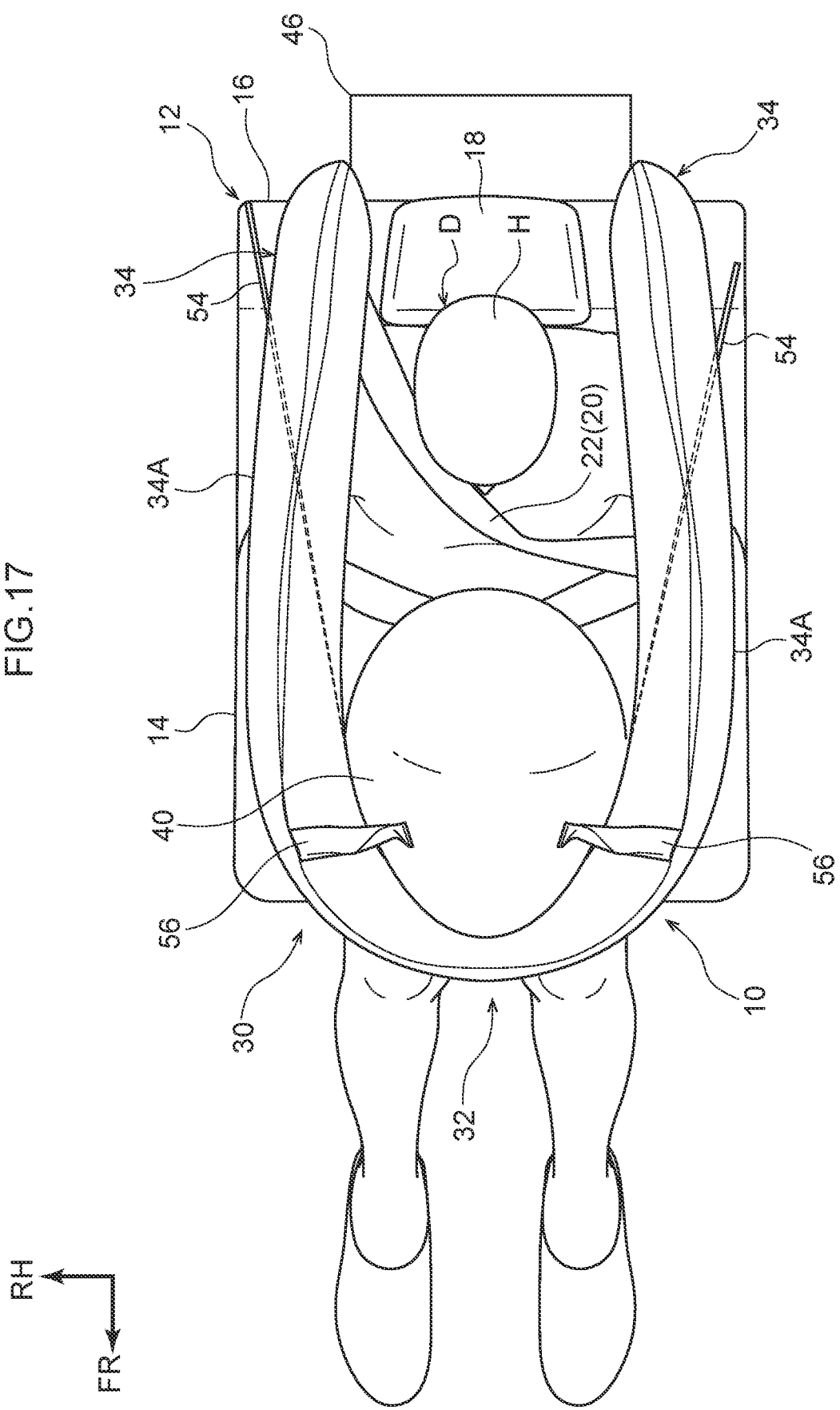
FIG. 17 is a schematic plan view illustrating an airbag in an airbag device according to a third exemplary embodiment in an inflated and deployed state for a passenger equivalent to an AM50.

More specifically as illustrated in FIG. 17, the length of the rear tether 54 on the non-shoulder belt side (left side) is made shorter than the length of the rear tether 54 on the shoulder belt side (right side). This thereby enables the pulling forces from the rear tethers 54 obliquely rearward and downward to be different (to be changed) between the left and right, enabling an increase to be achieved in the withstand load for the front-rear direction at the non-shoulder belt side rear tether 54.

Namely, the pulling force from the non-shoulder belt side rear tether 54 can be made greater than the pulling force from the shoulder belt side rear tether 54. This enables the passenger restraint force resulting from the airbag body 40 and the seatbelt device 20 to be adjusted so as to be substantially the same on the left and right, enabling a good balance to be achieved between the left and right restraint of the passenger D, and particularly with respect to the upper body thereof. The third exemplary embodiment is accordingly able to improve the passenger restraint performance with a simple configuration merely by changing the length of the rear tethers 54.

Fourth Exemplary Embodiment

Next, description follows regarding a fourth exemplary embodiment. Note that the same reference numerals will be appended to locations equivalent to those of the first exemplary embodiment to the third exemplary embodiment and detailed explanation thereof will be omitted (including of common operation and effects).

In the fourth exemplary embodiment too, the pulling force from the rear tethers 54 acting relatively obliquely rearward and downward with respect to the airbag body 40 is greater at the non-shoulder belt side than at the shoulder belt side of the seatbelt 22 of the seatbelt device 20 such that the left and right passenger restraint forces resulting from the airbag body 40 and the three-point seatbelt device 20 are substantially the same.

Figure 18:
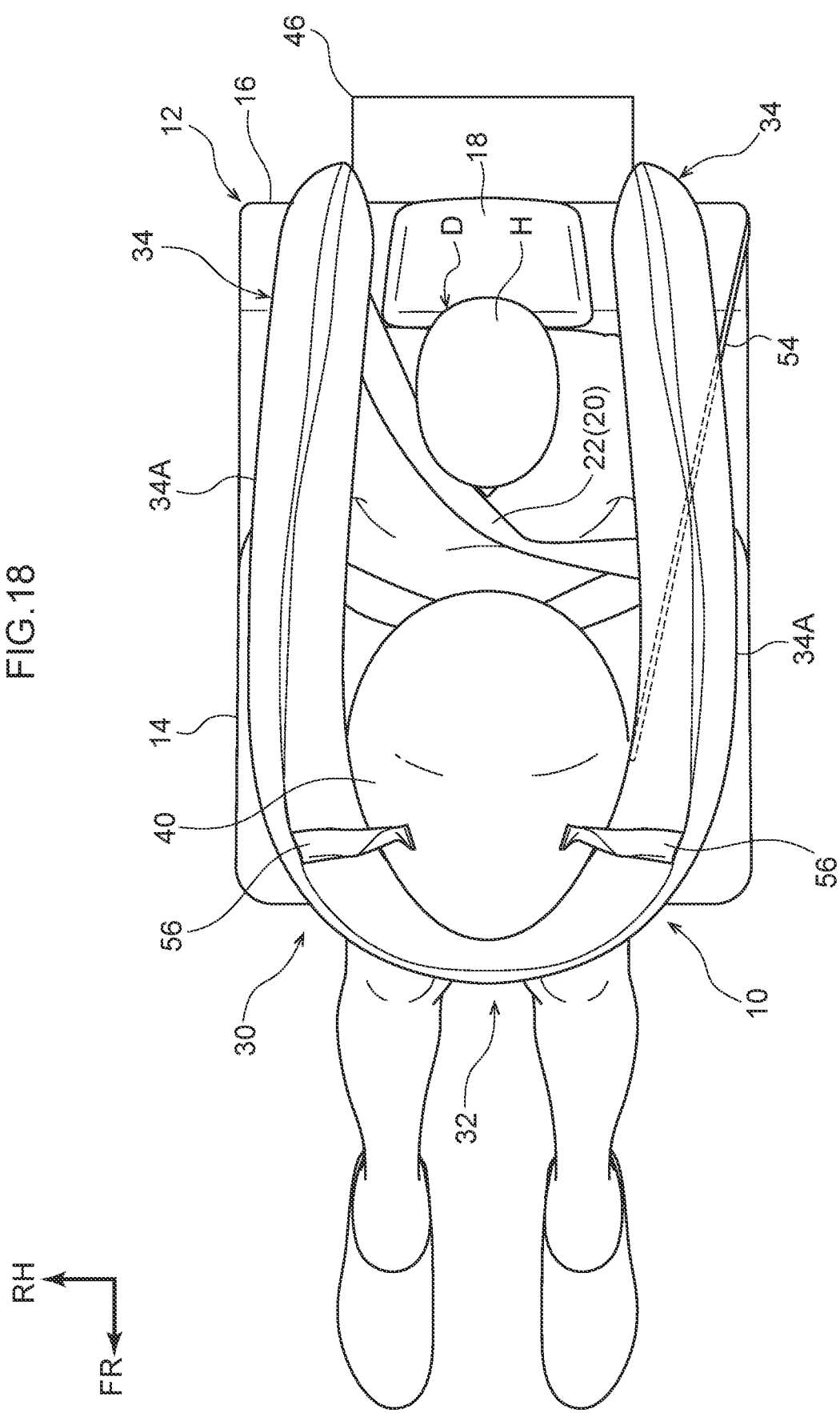
FIG. 18 is a schematic plan view illustrating an airbag in an airbag device according to a fourth exemplary embodiment in an inflated and deployed state for a passenger equivalent to an AM50.

More specifically, a configuration is adopted such that a pulling force from the rear tether 54 relatively obliquely rearward and downward with respect to the airbag body 40 only arises on the non-shoulder belt side (left side). Namely, as illustrated in FIG. 18, the rear tether 54 is provided only at the non-shoulder belt side, and is not provided on the shoulder belt side. The pulling force from the rear tether 54 relatively obliquely rearward and downward with respect to the airbag body 40 accordingly does not arise on the shoulder belt side.

This thereby enables the passenger restraint force resulting from the airbag body 40 and the seatbelt device 20 to be adjusted so as to be substantially the same on the left and right, enabling a good balance to be achieved between the left and right restraint of the passenger D, and particularly with respect to the upper body thereof. The fourth exemplary embodiment is accordingly able to improve the passenger restraint performance with a simple configuration in which the rear tether 54 is only provided on the non-shoulder belt side.

Note that as long as a rear tether 54 is configured such that pulling force relatively obliquely rearward and downward with respect to the airbag body 40 does not arise, such a rear tether 54 may be provided on the shoulder belt side. For example, a rear tether 54 may be provided on the shoulder belt side as long as this rear tether 54 is configured from a material that stretches accompanying tensional loading such that tension does not arise (such that swinging of the airbag body 40 in the height direction can be restricted, but swinging in the front-rear direction is not able to be restricted).

Figure 19:
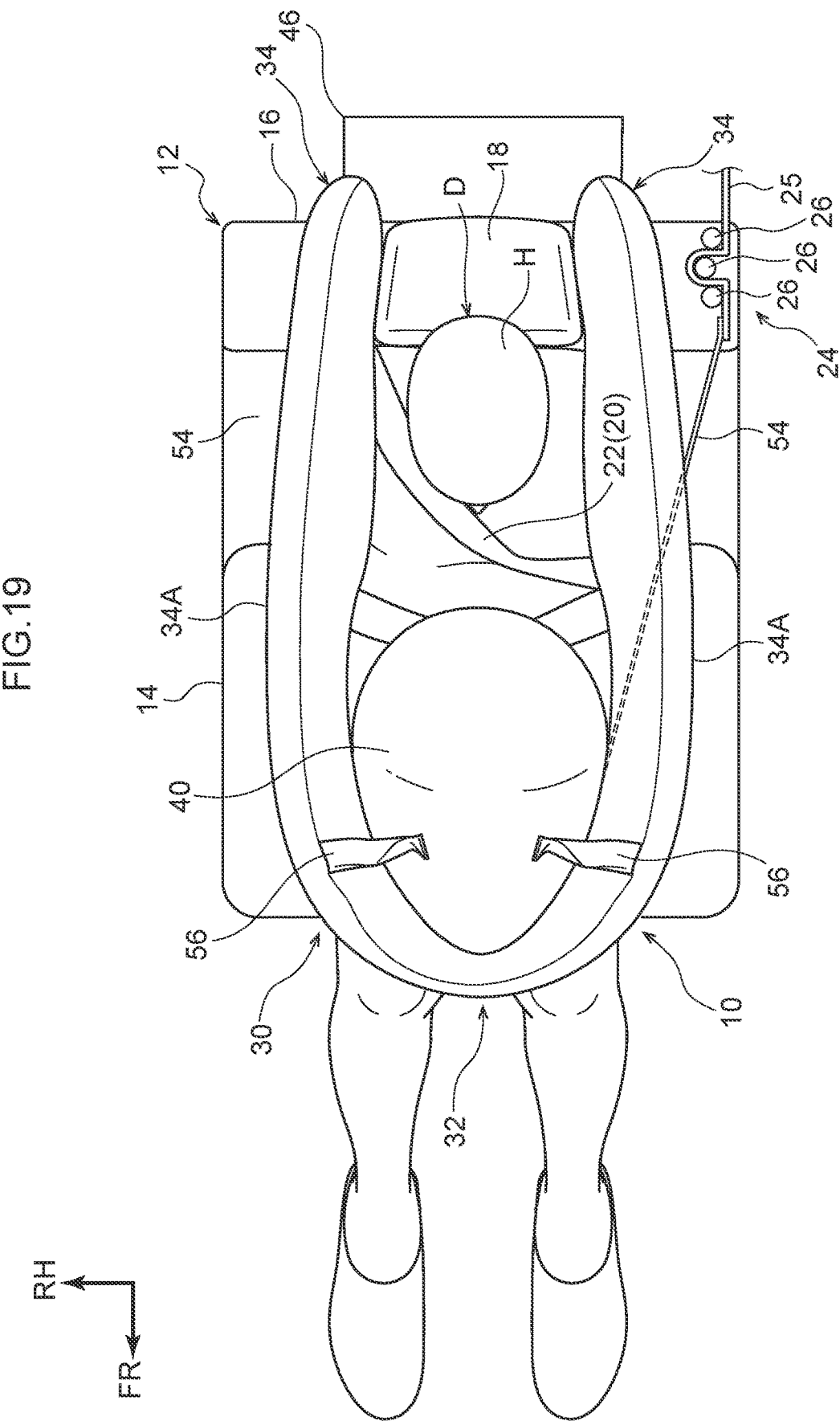
FIG. 19 is a schematic plan view illustrating an airbag in an airbag device according to a modified example of the fourth exemplary embodiment in an inflated and deployed state for a passenger equivalent to an AM50.

As illustrated in FIG. 19, a force limiter mechanism 24 may be installed at the other-end portion of the rear tether 54 on the non-shoulder belt side (left side). The force limiter mechanism 24 is configured including a metal draw plate 25 integrally attached to the other-end portion of the rear tether 54, and three winding portions 26 having the draw plate 25 wound around in mutually different winding directions. This results in a configuration in which pull-out (sliding) of the rear tether 54 toward an obliquely forward and upward side by plastic deformation of the draw plate 25 is prevented until a peak load (withstand load) is exceeded at a later-stage of restraint.

The force limiter mechanism 24 such as this enables easy implementation such that the left and right passenger restraint forces resulting from the airbag body 40 and the seatbelt device 20 is substantially the same, enabling the passenger restraint performance to be improved more simply. Note that the withstand load of the force limiter mechanism 24 can be set with good accuracy by adjusting a substance and plate thickness of the draw plate 25, and by adjusting a spacing between each of the winding portions 26 that the draw plate 25 is wound around.

Fifth Exemplary Embodiment

Next, description follows regarding a fifth exemplary embodiment. Note that the same reference numerals will be appended to locations equivalent to those of the first exemplary embodiment to the fourth exemplary embodiment and detailed explanation thereof will be omitted (including of common operation and effects).

In the fifth exemplary embodiment too, the pulling force from the rear tethers 54 acting relatively obliquely rearward and downward with respect to the airbag body 40 is greater at the non-shoulder belt side than at the shoulder belt side of the seatbelt 22 of the seatbelt device 20, such that the left and right passenger restraint forces resulting from the airbag body 40 and the three-point seatbelt device 20 are substantially the same.

Figure 20:
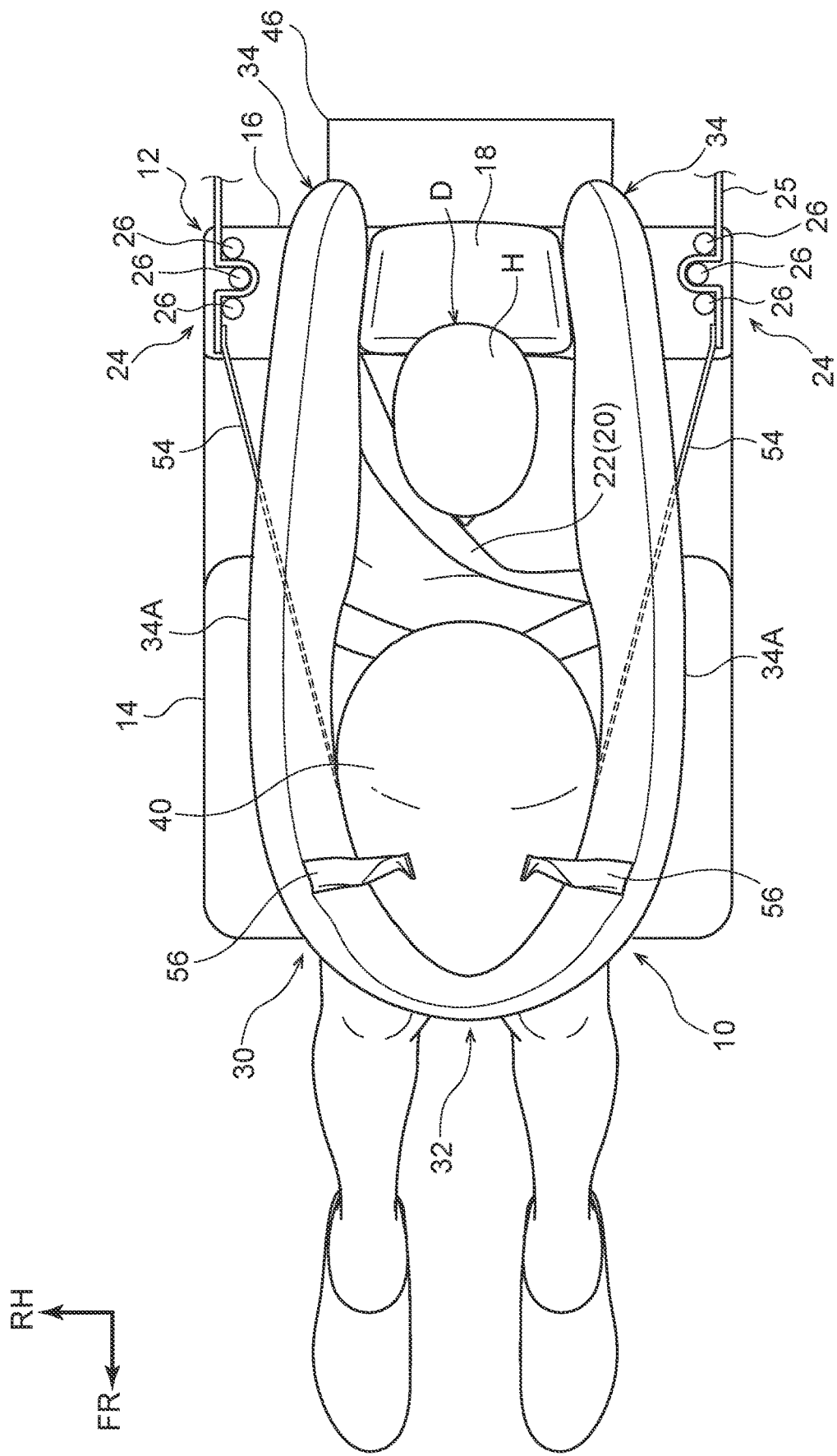
FIG. 20 is a schematic plan view illustrating an airbag in an airbag device according to a fifth exemplary embodiment in an inflated and deployed state for a passenger equivalent to an AM50.

More specifically, as illustrated in FIG. 20, a force limiter mechanism 24 is set at each of the other-end portions of the pair of rear tethers 54. The withstand load of the force limiter mechanism 24 is set so as to be greater on the non-shoulder belt side than on the shoulder belt side. This means that the pulling force of the rear tethers 54 is different between the left and right, and the pulling force from the rear tethers 54 acting relatively obliquely rearward and downward with respect to the airbag body 40 is greater on the non-shoulder belt side than on the shoulder belt side.

Figure 21:
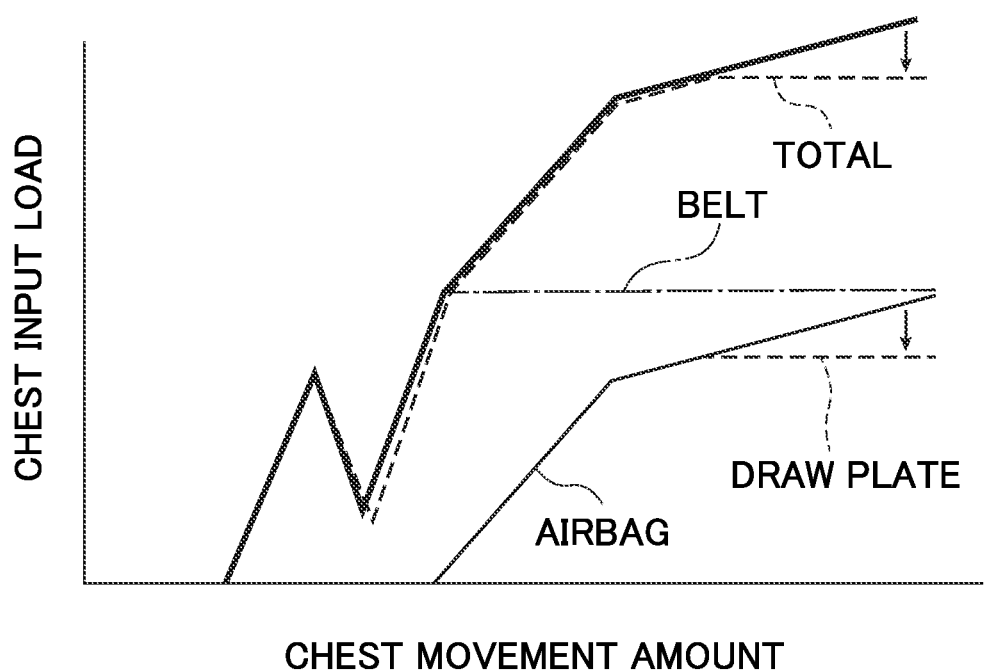
FIG. 21 is a graph illustrating a relationship of input load of a shoulder belt side (right trunk side) and non-shoulder belt side (left trunk side) according to the fifth exemplary embodiment to a chest movement amount.

Namely, the passenger restraint force resulting from the airbag body 40 and the seatbelt device 20 can be adjusted so as to be substantially the same on the left and right, enabling a good balance to be achieved between the left and right restraint of the passenger D, and particularly with respect to the upper body thereof (see FIG. 21). This accordingly enables the passenger restraint performance to be improved. Moreover, such force limiter mechanisms 24 enable easy implementation such that the left and right passenger restraint forces resulting from the airbag body 40 and the seatbelt device 20 are substantially the same.

Although the airbag device 30 and the passenger protection device 10 according to the present exemplary embodiment have been described with reference to the drawings, the airbag device 30 and the passenger protection device 10 according to the present exemplary embodiment are not limited to those illustrated in the drawings, and appropriate design changes may be made within a range not departing from the spirit of the present disclosure.

For example, instead of each of the one-end portions of the pair of rear tethers 54 being attached to the airbag body 40 at the respective wall faces on the left and right sides at a front side of a lower portion of the airbag body 40 inflated and deployed further downward than the front-rear chamber 34, each of the one-end portions may be attached by being sewn to a length direction intermediate portion of the pair of front-rear extension portions 34A, and more specifically to each of the front portions (front side portions) of the inflated and deployed front-rear extension portions 34A. Namely, a configuration may be adopted in which, at a time of restraint of the passenger D, the pair of front-rear extension portions 34A press the shoulders K of the passenger D from the upper side by each of the front portions of the front-rear extension portions 34A being pulled relatively obliquely rearward and downward by the rear tethers 54.

What is claimed is:

1. An airbag device comprising:
an inflator that generates gas at a time of a vehicle collision; and
an airbag that is supplied with the gas generated by the inflator, and that inflates and deploys from a seat rear side of a vehicle seat toward a seat front side via a seat upper side, wherein:
in an inflated and deployed state, the airbag includes:
a front-rear chamber that includes a pair of front-rear extension portions extending in a seat front-rear direction via left and right sides of a head of a passenger seated in the vehicle seat and a coupling portion that connects front end portions of the pair of front-rear extension portions;
an airbag body that is in communication with the pair of front-rear chambers and the coupling portion, and is disposed at a seat front side of the passenger, between the pair of front-rear extension portions and at a rear side of the coupling portion; and
a pair of rear tethers including one-end portions attached to the airbag body or to seat front side portions of the front-rear extension portions, and other-end portions attached to a seatback of the vehicle seat or a vehicle body; and
at a time of restraint of the passenger, the airbag body or the seat front side portions of the front-rear extension portions are pulled by the rear tethers toward a seat obliquely rearward and downward side such that lower faces of the front-rear extension portions press shoulders of the passenger from the seat upper side.

2. The airbag device of claim 1, wherein a width between inside faces of the front-rear extension portions is less than a shoulder width of the passenger having a small build, equivalent to a person dummy AF05.

3. The passenger protection device of claim 2, wherein the width between the inside faces of the pair of front-rear extension portions is set from 400 mm to 500 mm.

4. The passenger protection device of claim 3, wherein the width between the inside faces of the pair of front-rear extension portions is set from 400 mm to about 450 mm.

5. A passenger protection device comprising:
an inflator that generates gas at a time of a vehicle collision;
an airbag that is supplied with the gas generated by the inflator, and that inflates and deploys from a seat rear side of a vehicle seat toward a seat front side via a seat upper side; and
a three-point seatbelt device provided at the vehicle seat to restrain a passenger, wherein:
in an inflated and deployed state, the airbag includes:
a pair of front-rear chambers extending in a seat front-rear direction via left and right sides of a head of a passenger seated in the vehicle seat;
an airbag body that is in communication with the pair of front-rear chambers and that is disposed at a seat front side of the passenger, between the pair of front-rear chambers; and
a rear tether including a one-end portion attached to the airbag body or to a seat front side portion of one of the pair of the front-rear chambers and an other-end portion attached to a seatback of the vehicle seat or a vehicle body, wherein:
the rear tether is provided only at a non-shoulder belt side of the seatbelt device such that left and right passenger restraint forces resulting from the airbag body and the seatbelt device are balanced in the left and right restraint of the passenger; and
at a time of restraint of the passenger, the airbag body or the seat front side portion of the front-rear chamber is pulled by the rear tether toward a seat obliquely rearward and downward side such that a lower face of the front-rear chamber presses a shoulder of the passenger from the seat upper side.

6. The passenger protection device of claim 5, wherein a force limiter mechanism is installed at the other-end portion of the rear tether.

7. The airbag device of claim 1, wherein a pulling force from the rear tethers acting toward the seat obliquely rearward and downward side with respect to the airbag body or the seat front side portions of the front-rear extension portions is greater at a non-shoulder belt side than at a shoulder belt side of a three-point seatbelt device such that left and right passenger restraint forces resulting from the airbag body and the seatbelt device are balanced in the left and right restraint of the passenger.

8. The airbag device of claim 7, wherein a height position of the other-end portion of the rear tether at the non-shoulder belt side is higher than a height position of the other-end portion of the rear tether at the shoulder belt side.

9. The airbag device of claim 7, wherein a length of the rear tether at the non-shoulder belt side is shorter than a length of the rear tether at the shoulder belt side.

10. The airbag device of claim 7, wherein:
a force limiter mechanism is installed at the other-end portion of each of the pair of rear tethers; and
a withstand load of the force limiter mechanisms is greater at the non-shoulder belt side than at the shoulder belt side.

11. A passenger protection device comprising:
a vehicle seat for a passenger to sit on; and
the airbag device of claim 1 installed at a location at the seat rear side of the vehicle seat.

12. An airbag device comprising:
an inflator that generates gas at a time of a vehicle collision; and
an airbag that is supplied with the gas generated by the inflator, and that inflates and deploys from a seat rear side of a vehicle seat toward a seat front side via a seat upper side, wherein:
in an inflated and deployed state, the airbag includes:
a pair of front-rear chambers extending in a seat front-rear direction via left and right sides of a head of a passenger seated in the vehicle seat;
an airbag body that is in communication with the pair of front-rear chambers and that is disposed at a seat front side of the passenger, between the pair of front-rear chambers; and
a pair of rear tethers including one-end portions attached to the airbag body or to seat front side portions of the front-rear chambers, and other-end portions attached to a seatback of the vehicle seat or a vehicle body; and
at a time of restraint of the passenger, the airbag body or the seat front side portions of the front-rear chambers are pulled by the rear tethers toward a seat obliquely rearward and downward side such that the front-rear chambers press shoulders of the passenger from the seat upper side,
wherein a pulling force from the rear tethers acting toward the seat obliquely rearward and downward side with respect to the airbag body or the seat front side portions of the front-rear chambers is greater at a non-shoulder belt side than at a shoulder belt side of a three-point seatbelt device such that left and right passenger restraint forces resulting from the airbag body and the seatbelt device are balanced in the left and right restraint of the passenger.

13. The airbag device of claim 12, wherein a height position of the other-end portion of the rear tether at the non-shoulder belt side is higher than a height position of the other-end portion of the rear tether at the shoulder belt side.

14. The airbag device of claim 12, wherein a length of the rear tether at the non-shoulder belt side is shorter than a length of the rear tether at the shoulder belt side.

15. The airbag device of claim 12, wherein:
- a force limiter mechanism is installed at the other-end portion of each of the pair of rear tethers; and
- a withstand load of the force limiter mechanisms is greater at the non-shoulder belt side than at the shoulder belt side.

\* \* \* \* \*